US011662971B2

(12) United States Patent
Song et al.

(10) Patent No.: US 11,662,971 B2
(45) Date of Patent: May 30, 2023

(54) DISPLAY APPARATUS AND CAST METHOD

(71) Applicant: Hisense Visual Technology Co., Ltd., Shandong (CN)

(72) Inventors: Ziquan Song, Shandong (CN); Xiujuan Pang, Shandong (CN); Zhikui Wang, Shandong (CN); Yanmei Yu, Shandong (CN); Naijin Li, Shandong (CN)

(73) Assignee: HISENSE VISUAL TECHNOLOGY CO., LTD., Shandong (CN)

( * ) Notice: Subject to any disclaimer, the term of this patent is extended or adjusted under 35 U.S.C. 154(b) by 0 days.

(21) Appl. No.: 17/805,276

(22) Filed: Jun. 3, 2022

(65) Prior Publication Data
US 2022/0300241 A1 Sep. 22, 2022

Related U.S. Application Data

(63) Continuation of application No. PCT/CN2021/081889, filed on Mar. 19, 2021.

(30) Foreign Application Priority Data

Apr. 24, 2020 (CN) .......................... 202010331501.3
Apr. 24, 2020 (CN) .......................... 202010334727.9

(51) Int. Cl.
*G06F 3/14* (2006.01)
*G09G 3/20* (2006.01)

(52) U.S. Cl.
CPC ......... *G06F 3/1454* (2013.01); *G09G 3/2096* (2013.01); *G09G 2340/045* (2013.01); *G09G 2340/0442* (2013.01); *G09G 2370/06* (2013.01); *G09G 2370/16* (2013.01)

(58) Field of Classification Search
CPC .................................................... G06F 3/1454
See application file for complete search history.

(56) References Cited

U.S. PATENT DOCUMENTS

| 2014/0333671 | A1 | 11/2014 | Phang et al. |
| 2015/0188998 | A1 | 7/2015 | Yuan |
| 2017/0142379 | A1 | 5/2017 | Kihara |
| 2017/0257403 | A1 | 9/2017 | Li et al. |

(Continued)

FOREIGN PATENT DOCUMENTS

| CN | 107105184 A | 8/2017 |
| CN | 110109636 A | 8/2019 |
| CN | 110267073 A | 9/2019 |

(Continued)

OTHER PUBLICATIONS

International Search Report, dated Jun. 18, 2021, from PCT/CN2021/081889 filed Mar. 19, 2021.

*Primary Examiner* — Gustavo Polo
(74) *Attorney, Agent, or Firm* — Workman Nydegger

(57) ABSTRACT

The disclosure provides a display apparatus and a cast method, including: a display; a rotation assembly; and a controller configured to receive image information sent from a terminal device. When the terminal is in a portrait mode, the image information includes effective area information and left and right black area information. The effective area information corresponds to content displayed on a current screen of the terminal device. The display is controlled to present a cast image based on the effective area information. The cast image is obtained by enlarging the effective area information by preset times.

20 Claims, 13 Drawing Sheets

(56) References Cited

U.S. PATENT DOCUMENTS

2019/0393280 A1  12/2019  Gao

FOREIGN PATENT DOCUMENTS

| CN | 110286864 | A | 9/2019 |
| CN | 110469751 | A | 11/2019 |
| CN | 110581960 | A | 12/2019 |
| CN | 110740364 | A | 1/2020 |
| JP | 2012-220595 | A | 11/2012 |

DISPLAY APPARATUS AND CAST METHOD

CROSS REFERENCE TO RELATED APPLICATIONS

This application is a continuation application of International Application No. PCT/CN2021/081889, filed on Mar. 19, 2021, which claims priorities to Chinese Patent Application No. 202010334727.9, filed on Apr. 24, 2020, and No. 202010331501.3, filed on Apr. 24, 2020, which are hereby incorporated by reference in its entirety.

FIELD

The application relates to the field of smart televisions, in particular to a display apparatus and a cast method.

BACKGROUND

Cast is an interaction operation between a terminal and a display apparatus. A video stream is transmitted generally via a wireless local area network to present an image on a terminal on the display apparatus. Taking mobile phone cast as an example, for a mobile phone and a smart television connected in the same WiFi network, an instruction for cast may be performed via a mobile phone to send images displayed on the mobile phone to the smart television via streaming, to obtain a better user experience with a large screen of the smart television.

However, there is always a difference between an image display ratio of terminals such as a mobile phone and a screen ratio of a display apparatus. For example, in a conventional operation, a screen display aspect ratio of a mobile phone is 1080:1940, while an aspect ratio of a display of a smart television is 1940:1080, that is, an image on the mobile phone is in a vertical state, while an image on the smart television is in a horizontal state. Therefore, when an image on the terminal is displayed through the smart television in a cast process, the cast image cannot be displayed properly due to the fact that the aspect ratio of the image on the terminal does not match the aspect ratio of the display.

In order to completely display an image on the mobile phone, the image needs to be scaled with the height of the image on the mobile phone as a reference. However, during scaling of the cast image, the difference of the image ratios leads to large black regions on two sides of an image displayed on the smart television, not only is the viewing experience of a user lowered, but also a display space on a screen is wasted.

SUMMARY

In one aspect, the application provides a display apparatus, including: a display; a rotation assembly, configured to drive the display to rotate to a rotation state, where the rotation state includes a landscape state or a portrait state; a communication interface, configured to connect with a terminal device; and a controller, in connection with the display, the rotation assembly and the communication interface and configured to: receive image information sent from the terminal device; where the image information includes effective area information and left and right black area information while the terminal device is in a portrait mode during transmission of the image information, and the effective area information corresponds to a content displayed on a current screen of the terminal device and is a rectangle with a width and a length; in response to a current rotation state of the display and the portrait mode of the terminal device being not matched, cause the rotation assembly to rotate the display to the portrait state to match the portrait mode of the terminal device; in response to a current rotation state of the display and the portrait mode of the terminal device being matched, not cause the rotation assembly to rotate the display and maintain the current rotation state of the display; and control the display to present a cast image based on the effective area information, where the cast image is obtained by enlarging the effective area information by preset times.

In another aspect, the disclosure further provides a cast method for a display apparatus, including: receiving image information sent from a terminal device, where the image information includes effective area information and left and right black area information while the terminal device is in a portrait mode during transmission of the image information, and the effective area information corresponds to a content displayed on a current screen of the terminal device and is a rectangle with a width and a length; in response to a current rotation state of the display and the portrait mode of the terminal device being not matched, causing the rotation assembly to rotate the display to the portrait state to match the portrait mode of the terminal device; in response to a current rotation state of the display and the portrait mode of the terminal device being matched, not causing the rotation assembly to rotate the display and maintaining the current rotation state of the display; and controlling the display to present a cast image based on the effective area information, where the cast image is obtained by enlarging the effective area information by preset times.

DETAILED DESCRIPTION OF THE EMBODIMENTS

The embodiments will be described in detail below, and examples thereof are shown in the accompanying drawings. When the following description refers to the accompanying drawings, unless otherwise indicated, the same numerals in different drawings indicate the same or similar elements. The following embodiments are not all embodiments of this disclosure. They are merely examples of systems and methods according to some embodiments of this disclosure.

The display apparatus may be an electronic apparatus with a large screen for presenting video and audio signals to a user, such as a smart television. The display apparatus may have an independent operating system and support function extension. Various applications may be installed in the display apparatus according to user's requirements, such as social applications like conventional video applications and short videos as well as reading applications for comics and books. These applications may show an application image by using the screen of the display apparatus to provide richer media resources for a user. Meanwhile, the display apparatus may further perform data interaction and resource share with different terminals. For example, a smart television may be connected with a mobile phone through wireless communications such as a local area network and Bluetooth, thereby playing resources in the mobile phone or directly displaying images on the mobile phone in a cast mode.

To facilitate showing target media resource detailed pages under different landscape and portrait states of a display apparatus for a user and improving user view experience under different viewing states of the display apparatus, embodiments of the application provides a display apparatus, such as a rotatable television; and a computer readable non-volatile storage medium. It should be noted that a method provided by the present embodiments is not only applicable to the rotatable television, but also other display apparatuses, such as a computer and a tablet computer.

The term "remote control" used in various embodiments of the application refers to a component of an electronic apparatus (such as the display apparatus disclosed in the application), which can generally control the electronic apparatus wirelessly within a short distance. Generally, the component may use infrared and/or radio frequency (RF) signals and/or Bluetooth to connect with the electronic apparatus. It can also include WiFi, a wireless universal serial bus (USB), Bluetooth, a motion sensor and other functional modules. For example, a handheld touch remote control replaces most of physical built-in hard keys in a general remote control device with a user interface in a touch screen.

Figure 1A:
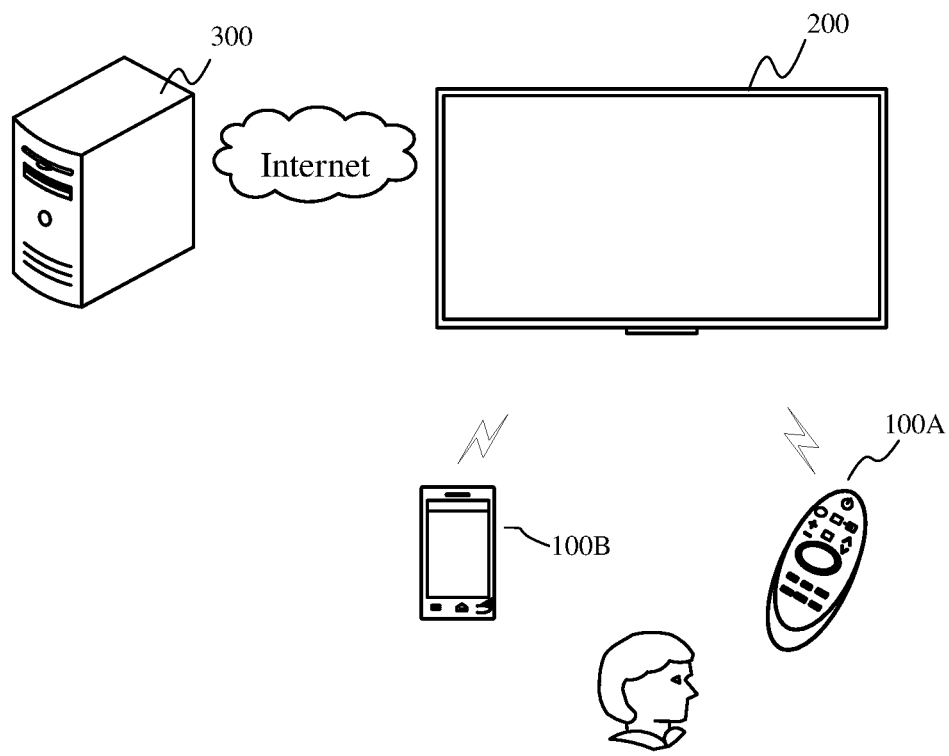
FIG. 1A illustrates a diagram of a scenario of a display apparatus according to an embodiment of this disclosure.

Referring to FIG. 1A, FIG. 1A illustrates a diagram of a scenario of a display apparatus according to some embodiments of the application. As shown in FIG. 1A, a control device 100 and the display apparatus 200 may communicate in a wired or wireless way.

The control device 100 is configured to control the display apparatus 200, may receive a command input from a user and convert the command into an instruction which can be recognized and responded by the display apparatus 200, and plays an interaction intermediary role between the user and the display apparatus 200.

The control device 100 may be a remote control 100A, including infrared protocol communication or Bluetooth protocol communication and other short-distance communication modes, and controls the display apparatus 200 in wireless or other wired modes. The user may input a command through keys on the remote control, voice input, control panel input and the like to control the display apparatus 200. For example, the user may input corresponding commands through a volume up/down key, a channel control key, an up/down/left/right directional key, a voice input key, a menu key, a power key and the like on the remote control, so as to realize the function of controlling the display apparatus 200.

The control device 100 may also be an intelligent device, such as a mobile terminal 100B, a tablet computer, a computer and a notebook computer. For example, an application running on the intelligent device is used to control the display apparatus 200. Through configuration, the application may provide various controls for the user on a screen associated with the intelligent device through an intuitive user interface (UI).

In some embodiments, software applications may be installed on both the mobile terminal 100B and the display apparatus 200, so as to realize connection and communication through a network communication protocol, and further achieve the purposes of one-to-one control operations and data communication. For example, a control instruction protocol may be established between the mobile terminal 100B and the display apparatus 200 to achieve functions of physical keys, for example, arranged on the remote control 100A by operating various functional keys or virtual controls on the user interface provided on the mobile terminal 100B. Audio and video contents displayed on the mobile terminal 100B may also be cast on the display apparatus 200 so as to realize a synchronous display function.

The display apparatus 200 may provide a network television function that a computer support in addition to a broadcast reception function. The display apparatus may be implemented as a digital television, a network television, an Internet protocol television (IPTV), etc.

The display apparatus 200 may be a liquid crystal display, an organic light emitting display, and a cast device. Types, sizes, resolutions, and the like of specific display apparatus are not limited.

The display apparatus 200 may further perform data communication with a server 300 in multiple communication modes. Here, the display apparatus 200 may be allowed to perform communication connection through a local area network (LAN), a wireless local area network (WLAN) or the other networks. The server 300 may provide various contents and interactions for the display apparatus 200. In some embodiments, the display apparatus 200 may send and receive information, for example, receive electronic program guide (EPG) data, receive software program update or access a remotely-stored digital media library.

Figure 1B:
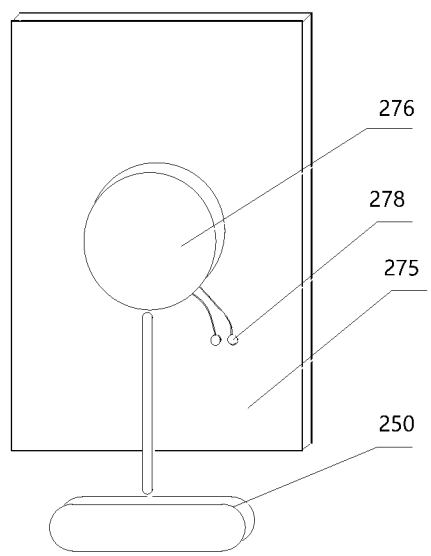
FIG. 1B illustrates a rear view of a display apparatus according to an embodiment of this disclosure.

In some embodiments, as shown in FIG. 1B, the display apparatus 200 includes a rotation assembly 276, a controller 250, a display 275, a terminal interface 278 extending from a gap in a back plate and the rotation assembly 276 connected with the back plate, and the rotation assembly 276 may rotate the display 275. From the angle of viewing from the front face of the display apparatus, the rotation assembly 276 may rotate a display screen to a portrait state, i.e., a state that the length of the screen at the vertical side is greater than the length of the screen at the horizontal side, and may also rotate the screen to the landscape state, i.e., a state that the length of the screen at the horizontal side is greater than the length of the screen at the vertical side.

Figure 2:
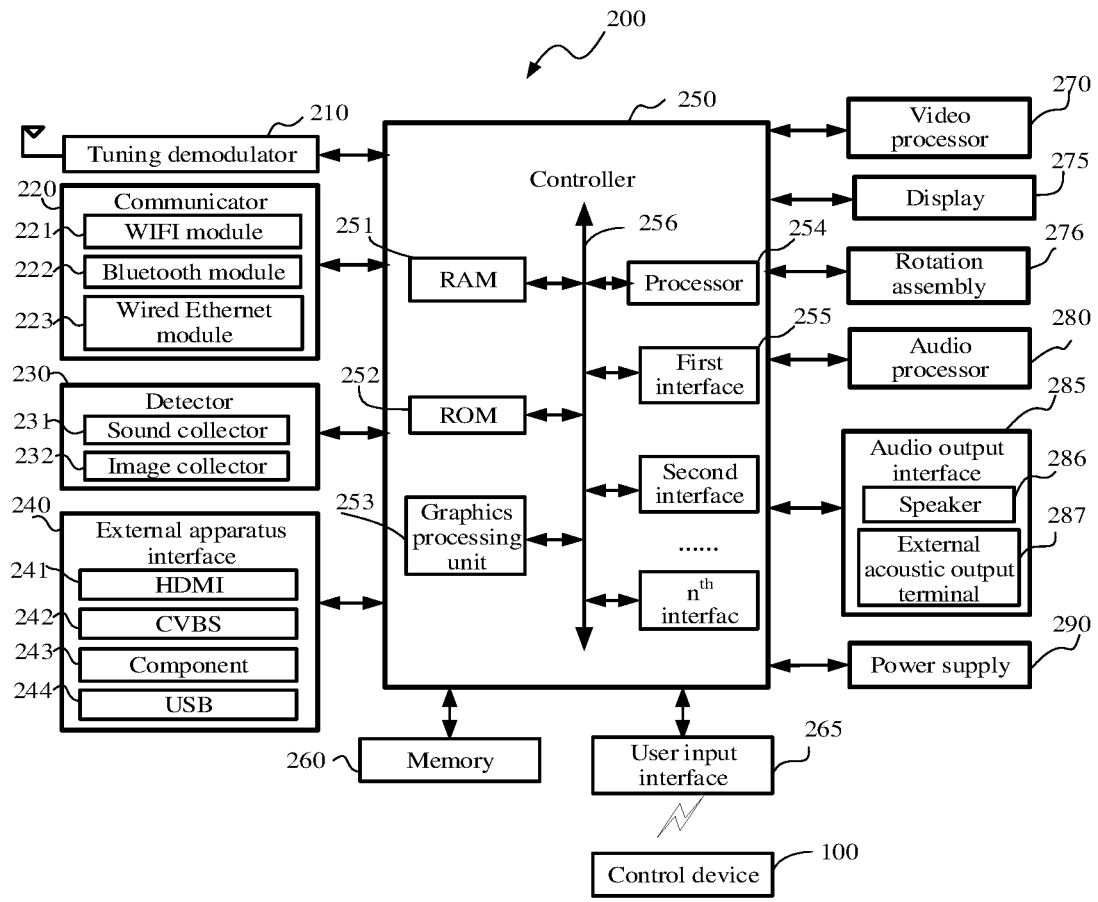
FIG. 2 illustrates a block diagram of hardware configuration of a control device according to an embodiment of this disclosure.

FIG. 2 illustrates a block diagram of hardware configuration of the display apparatus 200. As shown in FIG. 2, the display apparatus 200 may include a tuning demodulator 210, a communicator 220, a detector 230, an external apparatus interface 240, the controller 250, a memory 260, a user input interface 265, a video processor 270, the display 275, the rotation assembly 276, an audio processor 280, an audio output interface 285 and a power supply 290.

The rotation assembly 276 may include a driving motor, a rotating shaft and other parts. The driving motor may be connected with the controller 250 and controlled by the controller 250 to output a rotation angle. One end of the rotating shaft is connected with a power output shaft of the driving motor, and the other end is connected with the display 275, so that the display 275 may be fixedly mounted on a wall or a support through the rotation assembly 276.

The rotation assembly 276 may further include other parts, such as a transmission part and a detection part. The transmission part may adjust a rotating speed and a moment output from the rotation assembly 276 through a specific transmission ratio, and it may be a gear transmission mode. The detection part may include sensors disposed on the rotating shaft, such as an angle sensor and an attitude sensor. These sensors may detect parameters such as the rotation angle of the rotation assembly 276 and send the detected parameters to the controller 250 to enable the controller 250 to determine or adjust the state of the display apparatus 200 according to the detected parameters. In practical applications, the rotation assembly 276 may include but is not limited to one or more of the above parts.

In some other embodiments, the tuning demodulator 210 may also be in an external device, such as an external set top box. In this way, the set top box outputs the television signals after modulation and demodulation to input the signals into the display apparatus 200 through the external apparatus interface 240.

The communicator 220 is a component configured to communicate with an external device or an external server according to various communication protocol types. For example, the display apparatus 200 may send content data to the external device connected via the communicator 220, or browse and download the content data from the external device connected via the communicator 220. The communicator 220 may include a WIFI module 221, a Bluetooth communication protocol module 222, a wired Ethernet communication protocol module 223, and other network communication protocol modules or near field communication protocol modules, so that the communicator 220 may receive the control signal of the control device 100 according to control of the controller 250, and implement the control signal as a WIFI signal, a Bluetooth signal, a radio frequency signal and the like.

The detector 230 is a component for the display apparatus 200 to collect a signal from an external environment or a signal interacting with the outside. The detector 230 may include a sound collector 231, such as a microphone, which may be configured to receive sound from a user, for example, a voice command from a user to control the display apparatus 200; or may collect environmental sound for recognizing environmental scene types, so that the display apparatus 200 may be self-adaptive to environmental noise.

In some other embodiments, the detector 230 may further include an image collector 232, such as a camera and a webcam, which may be configured to collect an external environment scene, so as to change display parameters of the display apparatus 200 accordingly; and configured to collect attributes of the user or interact with the user via gestures, so as to realize an interaction function between the display apparatus and the user.

In some other embodiments, the detector 230 may further include an optical receiver, configured to collect an environment light intensity so as to adjust the display parameters of the display apparatus 200 accordingly.

The external apparatus interface 240 is a component for providing the controller 250 with controlling over data transmission between the display apparatus 200 and an external device. The external apparatus interface 240 may be connected with external devices such as a set top box, a game apparatus and a notebook computer in a wired/wireless mode, and may receive data such as a video signal (such as a motion image), an audio signal (such as music), additional information (such as EPGs) from the external devices.

The external device interface 240 may include: any one or more of a high definition multimedia interface (HDMI) 241, a composite video blanking synchronization (CVBS) interface 242, an analog or digital component interface 243, a universal serial bus (USB) interface 244, a component interface (not shown in the figure), or a red, green and blue (RGB) interface (not shown in the figure).

The controller 250 is configured to control working of the display apparatus 200 and responds to operations from the user by running various software control programs (such as an operating system and various applications) stored on the memory 260.

The ROM is configured to store various system initialization instructions. For example, when a power-on signal is received, a power source of the display apparatus 200 begins to start, the CPU 254 runs the system initialization instructions in the ROM 252 to copy an operating system stored in the memory 260 into the RAM 251 so as to initialize the operating system. After the operating system is initialized, the CPU 254 copies the various applications in the memory 260 into the RAM 251 again, and then, begins to launch the various applications.

The graphics processing unit 253 is configured to generate various graphic objects, such as an icon, an operating menu, user input instruction display graphics and the like. The graphics processing unit 253 may include an arithmetic unit, configured to perform computation by receiving various interactive instructions input from the user and then display various objects according to a display attribute; and include a renderer, configured to generate the various objects obtained based on the arithmetic unit and display a rendered result on the display 275.

In some embodiments, the CPU 254 may include a plurality of processors. The plurality of processors may include one main processor and one or more sub processors.

The communication interface 255 may include a first interface to an $n^{th}$ interface. These interfaces may be network interfaces connected with an external device via network.

The controller 250 may control the overall operation of the display apparatus 200. For example: in response to receiving a user input instruction for selecting a graphical user interface (GUI) object shown on the display 275, the controller 250 may execute the operation associated with the object selected by the user input instruction.

The memory 260 is configured to store various types of data, software programs or applications for driving and controlling the display apparatus 200 to run. The memory 260 may include a volatile and/or nonvolatile memory.

In some embodiments, the memory 260 is specifically configured to store programs for driving the controller 250 in the display apparatus 200; store various applications which are built in or downloaded by the user from an external device of the display apparatus 200; and store data for configuring the various GUIs provided by the display 275, the various objects relevant to the GUIs, and visual effect images of the selector configured to select the GUI objects.

Figure 3:
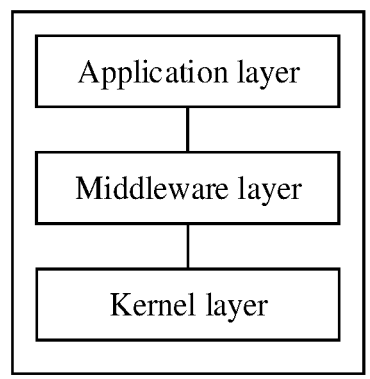
FIG. 3 illustrates a block diagram of architecture configuration of an operating system in a memory of a display apparatus according to an embodiment of this disclosure.

FIG. 3 illustrates a block diagram of architecture configuration of the operating system in the memory of the display apparatus 200. The architecture of the operating system includes an application layer, a middleware layer and a kernel layer from top to bottom.

As for the application layer, the built-in applications of the system and non-system-level applications are in the application layer. The application layer is responsible for directly interacting with the user. The application layer may include a plurality of applications, such as a setup application, e-pos application, and a media center application. These applications may be implemented as Web applications which are executed based on a WebKit engine, and specifically may be developed and executed based on hypertext markup language (HTML) 5, a cascading style sheet (CSS), and JavaScript.

The middleware layer may provide some standard interfaces so as to support operations of various environments and systems. For example, the middleware layer may be implemented as a multimedia and hypermedia information coding expert group (MHEG) of the middleware related to data broadcasting, may further be implemented as digital living network alliance (DLNA) middleware related to external device communication, and may further be implemented as middleware providing browser environments running by all the applications in the display apparatus.

The kernel layer provides core system services, for example: file management, memory management, process management, network management and system security permission management. The kernel layer may be implemented as a kernel based on various operating systems, for example, a kernel based on a Linux operating system.

In FIG. 2, the user input interface 265 receives various user interactions. Specifically, the user interface is configured to send an input signal from the user to the controller 250, or transmits an output signal from the controller 250 to the user. In some embodiments, the remote control 100A may send the input signals, such as a power signal, a channel selection signal, and a volume adjusting signal which are input via the user input interface 265 from a user, and then the input signals are forwarded to the controller 250 by the user input interface 265; or the remote control 100A may receive the output signals such as audios, videos or data, output from the user input interface 265 and processed by the controller 250, and display the output signals or output the output signals in an audio or vibration form.

In some embodiments, a user may input a user instruction on a graphic user interface (GUI) displayed on the display 275, and the user input interface 265 receives the user input command through the GUI. Specifically, the user input interface 265 may receive user input commands for controlling the position of the selector in the GUI to select different objects or items.

A user may input a command by inputting specific sound or gesture, and then the user input interface 265 recognizes the sound or the gesture through the sensor so as to receive the command.

The video processor 270 is configured to receive an external video signal, and perform video data processing such as decompression, decoding, scaling, noise reduction, frame rate conversion, resolution conversion and image synthesis according to a standard encoding and decoding protocol of the input signal, so as to obtain the video signal directly displayed or played on the display 275.

The display 275 is configured to receive the image signal input from the video processor 270 and display a video content, an image and a menu manipulating interface. The displayed video content may come from the video content in the broadcast signal received by the tuning demodulator 210, or the video content input from the communicator 220 or the external apparatus interface 240. The display 275 simultaneously displays the user interface UI generated in the display apparatus 200 and configured to control the display apparatus 200.

The display 275 may include a panel component configured to present a picture and a driving component for driving image display. Or, if the display 275 is a cast display, it may further include a cast device and a cast screen.

As for the rotation assembly 276, the controller may send a control signal to enable the rotation assembly 276 to rotate the display 275.

The audio processor 280 is configured to receive an external audio signal and perform audio data processing such as decompression, decoding, noise reduction, digital-to-analog conversion and amplifying processing according to a standard encoding and decoding protocol of the input signal, so as to obtain an audio signal for being played in a speaker 286.

The audio output interface 285 is configured to receive the audio signal output from the audio processor 280 under control of the controller 250. The audio output interface 285 may include the speaker 286, or an external acoustic output terminal 287 output to a sound generating device of an external device, such as an earphone output terminal.

The power supply 290 is configured to provide power by an external power source for the display apparatus 200 as power supply support under control of the controller 250.

The power supply 290 may be a built-in power supply circuit installed in the display apparatus 200, or a power source installed outside the display apparatus 200.

In a cast process, the mobile terminal 100B may send image data to the display apparatus 200 through a wireless connection, such as Miracast, to form a cast video stream. After the display apparatus 200 receives the cast video stream, the cast video stream may be decoded through the controller 250 to parse a frame image, and a cast image is formed after the frame image is processed and sent to the display 275 for being displayed.

Figure 4A:
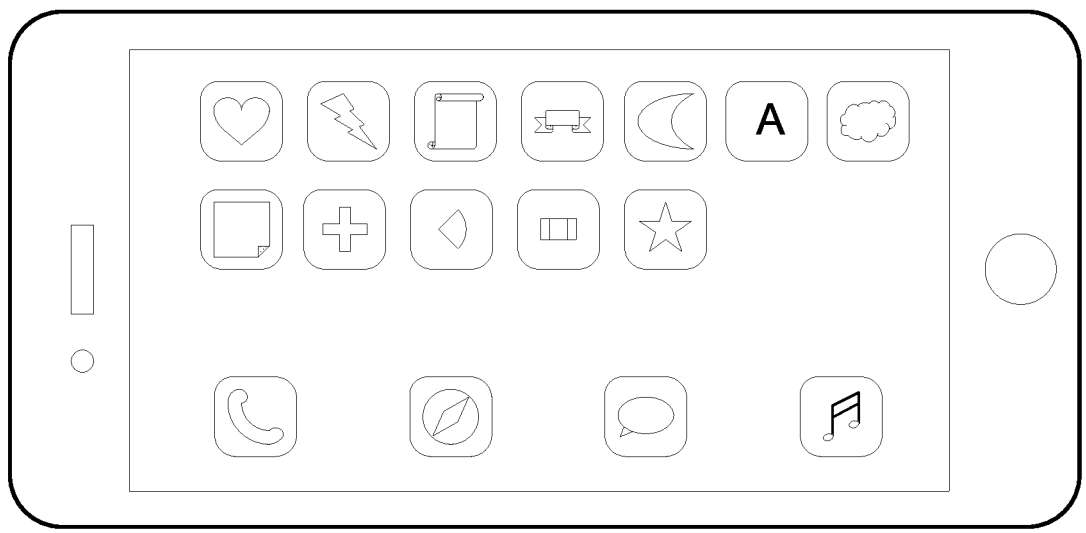
FIG. 4A illustrates a schematic diagram of a landscape mode of a mobile terminal according to an embodiment of this disclosure.
Figure 4B:
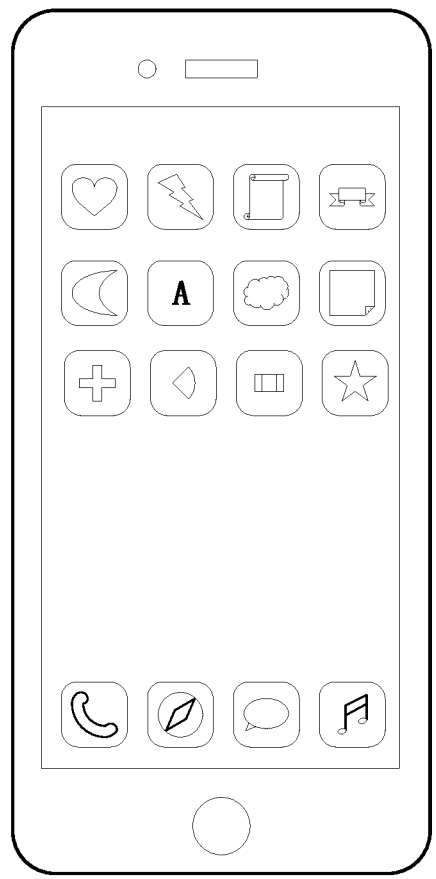
FIG. 4B illustrates a schematic diagram of a portrait mode of a mobile terminal according to an embodiment of this disclosure.

The mobile terminal 100B may be a smart terminal which allows for displaying and human-machine interaction, such as a mobile phone and a tablet computer. Since the mobile terminal 100B has different operation modes, the cast image also has different layouts. For example, when a mobile phone is held horizontally for operations, an image present on the mobile phone is a horizontal layout, that is, the width of the image is greater that the height of the image, and the mobile phone is in a landscape mode, as shown in FIG. 4A. When the mobile phone is held vertically for operations, an image present on the mobile phone is a vertical layout, that is, the width of the image is less that the height of the image, and the mobile phone is in a portrait mode, as shown in FIG. 4B.

For different types of mobile terminals 100B, there are also many different forms of display screen ratios. For example, a screen aspect ratio of a mobile phone is usually 9:16, 10:16, etc., and a screen aspect ratio of a tablet computer is 3:4, etc. The screen aspect ratio of some smart terminals may be 1:1, such as a smart watch. For a smart terminal with the screen aspect ratio of 1:1, the image layout presented in a landscape state and a portrait state is generally similar, and only the direction is different when it is displayed on a screen of the smart terminal. Therefore, for the mobile terminal 100B with the display screen aspect ratio of 1:1, a cast image formed during cast does not distinguish between the landscape and portrait states.

In order to cause the display apparatus 200 to automatically rotate the screen according to the landscape and portrait modes of the mobile terminal 100B during cast process, to achieve a better user experience, a cast protocol may be configured between the display apparatus 200 and the mobile terminal 100B, such as a cast protocol based on the Miracast standard, a cast protocol based on the DLNA standard, a cast protocol based on the Airplay standard, etc.; and the transmission of video streams can be realized through the cast protocol, so that the image on the mobile terminal 100B can be cast to the display apparatus 200.

Now, according to the specifications of the Miracast protocol, the video stream cast to the display apparatus 200 is always a 1920×1080 landscape stream no matter whether the mobile terminal 100B is in the landscape mode or the portrait mode, and the display apparatus cannot obtain the landscape and portrait relationship of the screen according to the resolution or aspect ratio of the video stream, leading to the failure of the display apparatus 200 to automatically rotate a television screen through the video stream.

Figure 5A:
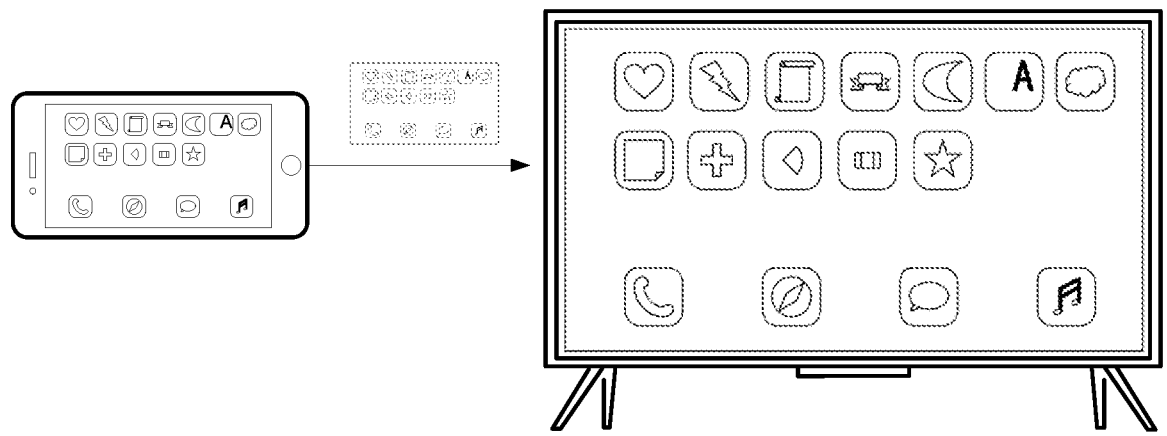
FIG. 5A illustrates a schematic diagram of a mobile terminal in a landscape mode sending image information to a display apparatus in a landscape state in an embodiment.
Figure 5B:
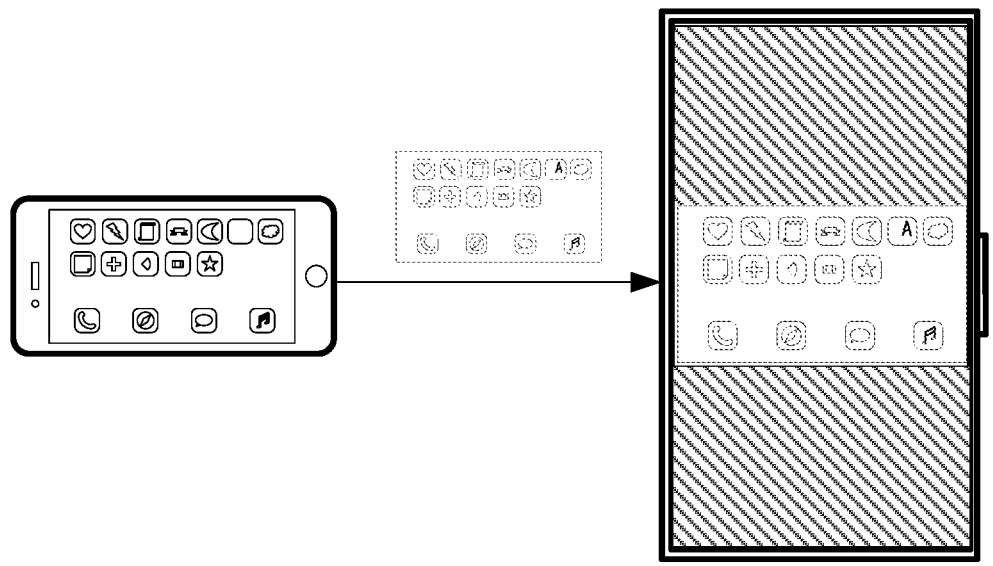
FIG. 5B illustrates a schematic diagram of a mobile terminal in a landscape mode sending image information to a display apparatus in a portrait state in an embodiment.

For example, when the mobile terminal performs cast interaction with the display apparatus, when the mobile terminal is in the landscape mode, no matter whether the display apparatus interacting with the mobile terminal is in a landscape state or a portrait state, image information sent from the mobile terminal to the display apparatus does not include left and right black area information, as shown in FIGS. 5A and 5B.

Figure 6A:
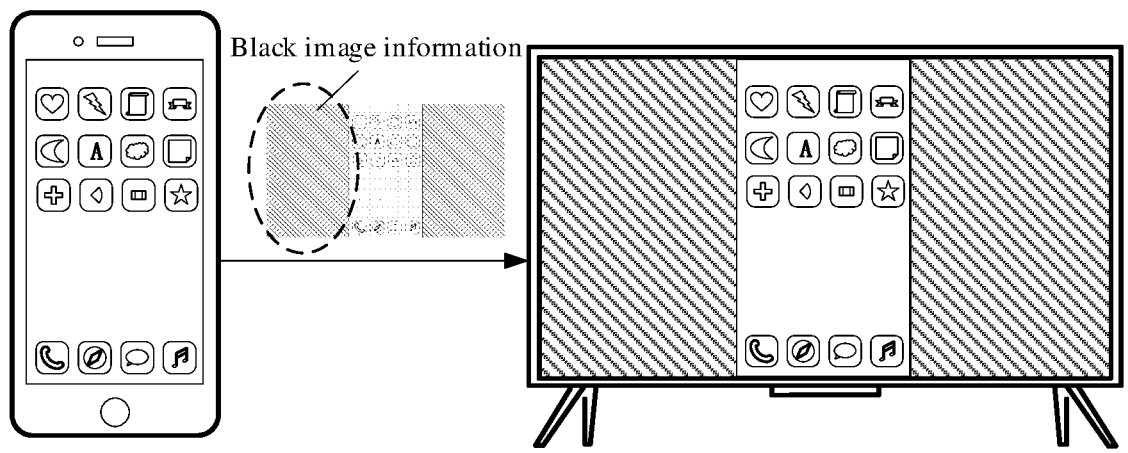
FIG. 6A illustrates a schematic diagram of a mobile terminal in a portrait mode sending image information to a display apparatus in a landscape state in an embodiment.
Figure 6B:
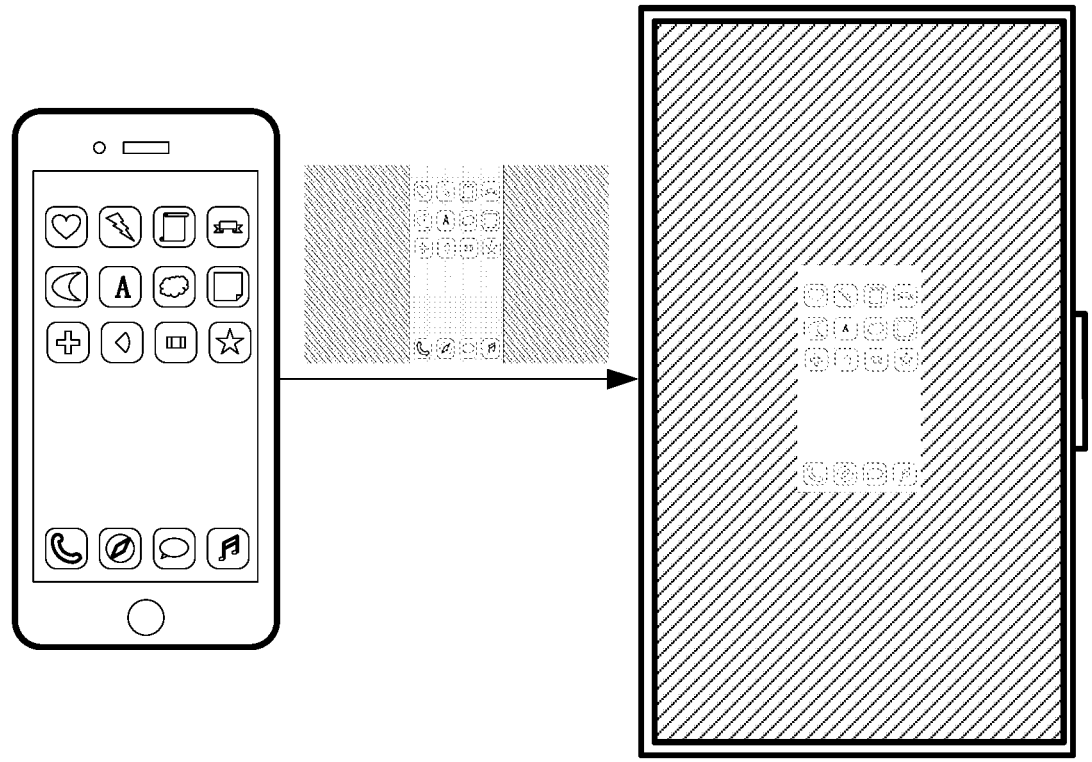
FIG. 6B illustrates a schematic diagram of an effect of presenting an image via a display apparatus in a portrait state according to a cast protocol.

When the mobile terminal is in the portrait mode, no matter whether the display apparatus interacting with the mobile terminal is in the landscape state or the portrait state, image information sent from the mobile terminal to the display apparatus includes left and right black area information, as shown in FIGS. 6A and 6B.

In the Miracast protocol, when the mobile terminal establishes communication connection with the display apparatus, the mobile terminal has added black edge on a screen image before the screen image is sent to the display apparatus, to ensure that, in the landscape state of the original display apparatus, a horizontal image is presented no matter whether the mobile terminal is placed horizontally or vertically.

In a cast image shown in FIG. 6A, image information shown in black regions on both sides of the image is black image information, or called black edges, and a display image region in the middle of the image is called an effective image (i.e., a screen display image corresponding to the mobile terminal), and the effective image is effective area information in the image information of the mobile terminal. In the region corresponding to the effective image, displayed is an operation image on the mobile terminal 100B, and the black edges are determined to have different widths and heights according to the screen ratio of the display 275 of the mobile terminal 100B.

Figure 6C:
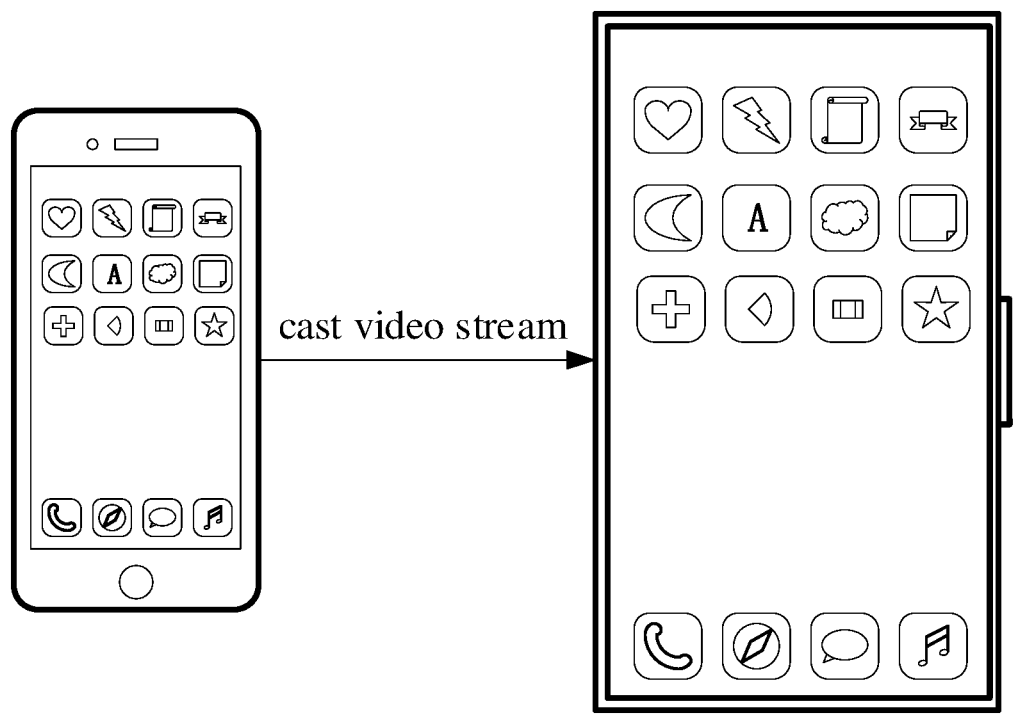
FIG. 6C illustrates a schematic diagram of a mobile terminal in a portrait mode sending image information to a display apparatus in a portrait state in an embodiment.

That is, when the display apparatus 200 displays an image cast from another device, it takes the direction corresponding to the shorter edge as the reference, such as a height direction in the landscape state. Therefore, the height direction of a cast video stream presented on the display apparatus 200 is generally kept unchanged. That is, no matter whether the placement direction of the mobile terminal 100B is the horizontal direction or the vertical direction, the height of the cast image received by the display apparatus 200 is 1080P. Even after the display 275 is rotated to the portrait state, it cannot present the display state as shown in FIG. 6C, but performs displaying according to the height of the entire image information including the left and right black area information, as shown in FIG. 6B. That is, in the portrait state, not only are the left and right sides of the effective image filled with black image information, but also the top and bottom of the cast image display black regions because there is no effective image to fill, which will greatly affect view experience of users.

In the cast process, an image display resolution corresponding to the cast video stream received by the display apparatus 200 is 1920×1080, that is, in the height direction, the cast image is based on the image on the terminal, and 1080 pixels are required for displaying. In the width direction, the cast image is based on the displayed image on the terminal plus widths of the black edges on both sides, and 1920 pixels are required for displaying. Accordingly, the height of an effective region in the cast image is 1080, and the width is scaled to be displayed according to the proportion of the height, which will greatly waste the display region on the display 275.

In order to improve the utilization of the display region on the display apparatus and enlarge the effective area information in a certain proportion to adapt to the video stream cast from the mobile terminal 100B, the following is performed.

In some embodiments, when the mobile terminal is in the landscape mode, the state shown in FIG. 4A is presented. In the cast process, frame data parsed from the video stream cast to the display apparatus has no left and right black edges. When the display apparatus receives the image information that does not include the left and right black edges, whether the display is in the landscape state is detected. When it is detected that the display is in the landscape state, the controller 250 receives the image information and may directly present the image information on the display. When it is detected that the display is in the portrait state, the controller 250 may send a rotation instruction to the rotation assembly 276 to control the rotation of the rotation assembly 276 to rotate the display to the landscape state.

When the mobile terminal is in the portrait mode, the state shown in FIG. 4B is presented. In the cast process, frame data parsed from the video stream cast to the display apparatus has left and right black edges and an effective image. When the display apparatus receives the image information with the left and right black edges, whether the display is in the portrait state is detected. When it is detected that the display is in the landscape state, the controller 250 may send a rotation instruction to the rotation assembly 276 to control the rotation assembly 276 to rotate the display 275 to the portrait state. When it is detected that the display is in the portrait state, the width of the display 275 is less than the height thereof, which is consistent with the display ratio of the image in the mobile terminal. In this case, the frame data in the cast video stream is enlarged to display the effective image on the display, and the left and right black areas cannot be presented on the display due to enlargement, thereby reducing the area of the black edges on both sides of the effective image, as shown in FIG. 6C.

In order to improve view experience for users and reduce the black image information on two sides of the image, the disclosure provides a display apparatus, which may determine whether a display needs to be rotated and an image needs to be adjusted according to whether image information of a cast data stream includes the left and right black area information, so that a display region is utilized to the maximum extent.

Figure 7:
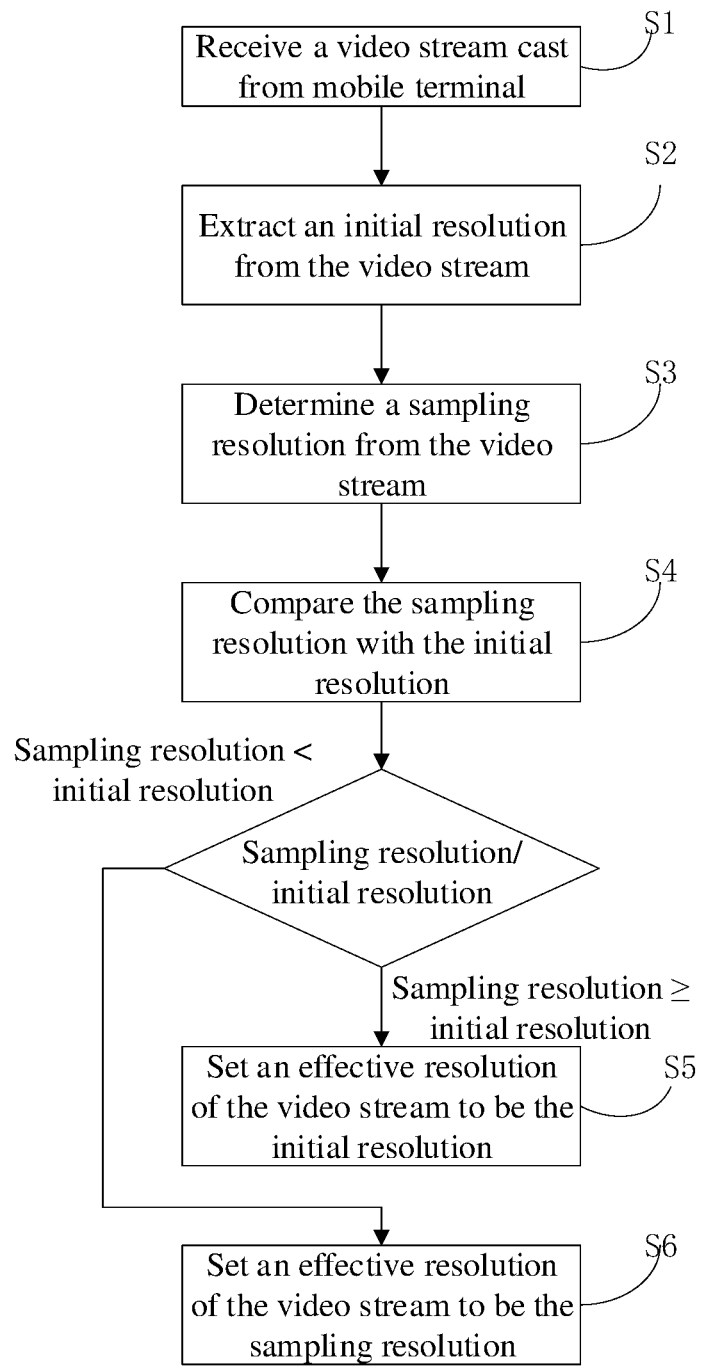
FIG. 7 illustrates a schematic flow diagram of a method for detecting an effective resolution of a cast video stream according to an embodiment of this disclosure.

The display apparatus includes: a display; a rotation assembly, configured to drive the display to rotate; a user communication interface, configured to connect with a terminal; and a controller, referring to FIG. 7, configured to perform following processes.

S1: receiving a video stream cast from mobile terminal.

In practical applications, a cast operation can be performed on a mobile terminal 100B, and then the mobile terminal will send a displayed image on the mobile terminal 100B to the display apparatus 200. For example, the user may perform a cast operation by selecting "setting-connection and share-cast" on a mobile phone and selecting a display apparatus in a current network from a device list for cast operation as a cast object.

After the cast operation is performed, the mobile terminal 100B will send the displayed image to the display apparatus 200 via a cast protocol, such as the Miracast protocol or other cast protocols. In the cast process, with continuous generation of new images on the mobile terminal, the mobile terminal 100B will send newly generated images to the display apparatus 200 frame by frame to form a cast data stream, which can be called the cast video stream in an example below).

It should be noted that the user may further perform the cast operation through a third-party application. For example, the user starts a video application, where a cast control or menu is disposed on a play interface of the video application; and the user may click the cast control to realize a cast operation. Typically, a cast image of the cast operation performed through the third-party application is determined based on a video resource which provides the cast operation. For example, when the video resource is a horizontal media resource such as a movie and a teleplay, the width of an effective image in the cast image is greater than the height thereof; and when the video resource is a vertical media resource such as a short video and a comic, the width of the effective image in the cast image is less than the height thereof.

S2: extracting an initial resolution from the video stream.

After the display apparatus 200 receives the video stream cast from the mobile device or cast video stream, the controller 250 of the display apparatus may analyze the cast video stream frame by frame to extract an initial resolution of the stream. The initial resolution is an overall resolution of the first frame in the cast video stream.

For example, an image aspect ratio of the cast video stream sent from the mobile terminal 100B is 1920:1080, and after receiving the cast video stream, the controller 250 may parse the cast video stream to obtain each frame of image. The initial resolution is extracted from a first frame of image, that is, the initial resolution is 1920×1080.

Apparently, the first frame of image is not only limited to the first frame of image in the whole cast process, but also the first few frames of the cast video stream or a corresponding frame of image at a specific time point. Since the initial resolution is the overall resolution of the cast image, information of the resolution is easily to obtain; and the earlier the initial resolution is obtained, the more advantageous an effective resolution of the cast video stream is timely detected, and the earlier the displayed image is adjusted to an appropriate state.

S3: determining a sampling resolution from the video stream.

After the initial resolution is extracted, the image in the cast video stream may be further sampled to determine a sampling resolution. The frame of image for sampling is called a sampling image. The sampling resolution is a resolution, extracted from the cast video stream according to a preset time interval, of an effective region (i.e., an effective image) on the sampling image.

In the sampling process, the preset time interval for sampling may be configured according to the processing capability of the controller 250, for example, an image after 10s of the first frame of image is used as a sampling image. In order to determine the effective image from the sampling image, color values of pixels in the sampling image may be traversed. Apparently, color values of pixels in a black edge region are values corresponding to black, color values of the pixels in the effective region are usually not all values corresponding to black, and thus, by traversing each pixel of the sampling image, a black and rectangular region may be determined as a black edge, while other regions may be effective regions.

S4: comparing the sampling resolution and the initial resolution.

After the initial resolution and the sampling resolution are determined for the cast video stream, the sampling resolution and the initial resolution may be compared to determine information (e.g., a ratio, a direction, etc.) of the effective image in the current cast video stream according to a difference between the sampling resolution and the initial resolution, so as to select display parameters according to information of the effective image or not.

For example, if the sampling resolution is equal to the initial resolution, that is, the resolution of the first frame of image is 1920×1080, and the resolution of the effective region determined in the sampling image is also 1920×1080, it indicates that there is no black edge in the current cast image, and the cast image can fill the display region full. That is, the display requirement of the cast image can be met by displaying directly in the landscape state of the display 275.

It should be noted that the resolution of the displayed image is usually represented by the number of pixels occupied in a width direction and a height direction of the image, such as 1920×1080. Direct comparison is usually difficult purely through the values of the resolution. For example, by comparison the values, the resolution 1920×1080 is equal to 1080×1920. Thus, in the comparison process, some values in the resolution may be extracted or the resolution is converted to other comparable values, and then comparison is performed to obtain a comparison result of the sampling resolution and the initial resolution. For example, the width or height of the overall image may be extracted from the initial resolution and compared with the height or width of the effective image extracted from the sampling resolution, so as to determine its effective resolution.

S5: if the sampling resolution is greater than or equal to the initial resolution, the effective resolution of the video stream is set to be the initial resolution.

In some embodiments, if a value corresponding to the sampling resolution is greater than or equal to a value corresponding to the initial resolution, it indicates that on the premise of a full display, the black edge regions in the current cast image are already the minimum. In this case, even if the image is scaled up or scaled down, the area of the black edge regions will not be reduced, and it is determined that the effective resolution of the video stream has not changed and is still the initial resolution.

S6: if the sampling resolution is less than the initial resolution, the effective resolution of the video stream is set to be the sampling resolution.

If a value corresponding to the sampling resolution is less than a value corresponding to the initial resolution, it is determined that the current cast image is filled with a great portion of black regions, and the display apparatus 200 may improve the display effect by rotating the display 275 and scaling the cast image.

A method for detecting an effective resolution of a cast video stream can extract the initial resolution and the sampling resolution from the cast video stream after receiving the cast video stream and then perform comparison to determine the effective resolution of the current video stream. If the sampling resolution is less than the initial resolution, the effective resolution of the video stream is set to be the sampling resolution. By setting the effective resolution of the video stream, the cast image may be displayed according to the effective resolution, so as to adapt to the display direction of the cast image and reduce the influence of the black edges to achieve the better user experience.

Figure 8:
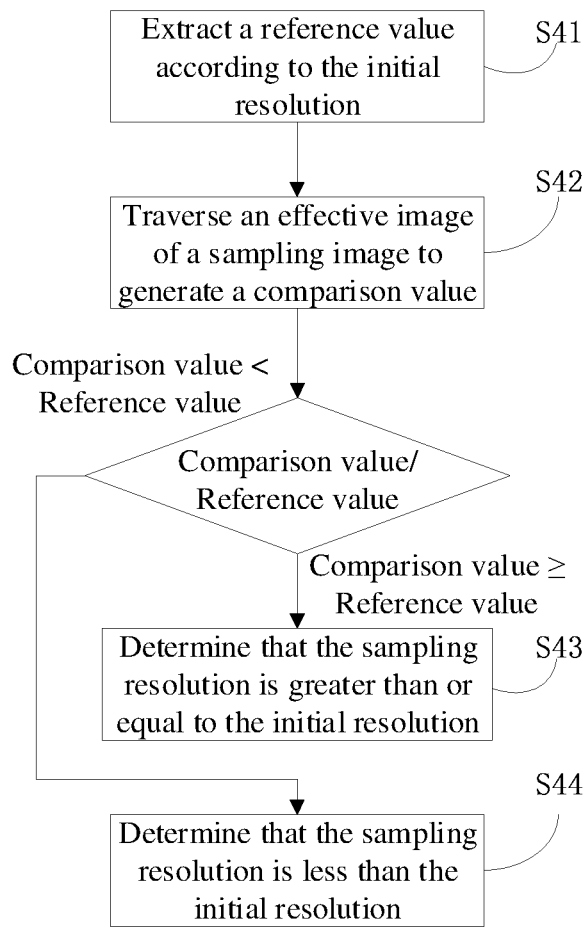
FIG. 8 illustrates a schematic flow diagram of comparing a sampling resolution with an initial resolution according to an embodiment of this disclosure.

In an embodiment, in order to realize the sampling resolution and the initial resolution, data that can be used for comparison may be extracted from the sampling resolution and the initial resolution respectively. That is, as shown in FIG. 8, comparing the sampling resolution with the initial resolution further includes the following.

S41: a reference value is extracted according to the initial resolution.

S42: an effective image of the sampling image is traversed to generate a comparison value.

S43: if the comparison value is greater than or equal to the reference value, it is determined that the sampling resolution is greater than or equal to the initial resolution.

S44: if the comparison value is less than the reference value, it is determined that the sampling resolution is less than the initial resolution.

After the initial resolution is obtained, a part of data may be extracted from the initial resolution as the reference value. For example, when the height of the cast image in the cast video stream is not changed, an overall image height of the first frame of image is used as the reference value. Color values of pixels in the sampling image are traversed to determine a ratio of the effective image so as to generate the comparison value. The comparison value is an image width of the effective image in the sampling image.

For example, the initial resolution extracted from the first frame of image is 1920×1080, so the extracted reference value is 1080. The color values of the pixels in the sampling image are traversed to determine that the resolution of the effective image with black regions removed is 960×1080, so the generated comparison value is 960.

After the reference value and the comparison value are determined, the relationship between the sampling resolution and the initial resolution may be determined by directly comparing the reference value with the comparison value; that is, if the comparison value is greater than or equal to the reference value, it is determined that the sampling resolution is greater than or equal to the initial resolution; and if the comparison value is less than the reference value, it is determined that the sampling resolution is less than the initial resolution.

For example, the reference value is 1080, the comparison value is 960, and since the comparison value 960 is less than the reference value 1080, it is determined that the sampling resolution is less than the initial resolution, that is, the effective resolution of the current cast video stream is set to be the sampling resolution. In the following displaying process, the cast image of the cast video stream may be scaled according to the effective resolution so as to be displayed.

Figure 9A:
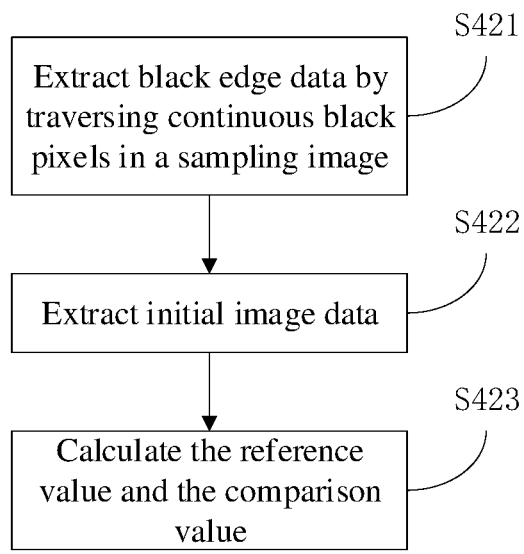
FIG. 9A illustrates a schematic flow diagram of calculating a reference value and a comparison value.

In order to calculate the comparison value, in some embodiments, as shown in FIG. 9A, the method further includes the following.

S421: black edge data is extracted by traversing continuous black pixels in the sampling image.

S422: initial image data is extracted.

S423: the reference value and the comparison value are calculated.

Figure 9B:
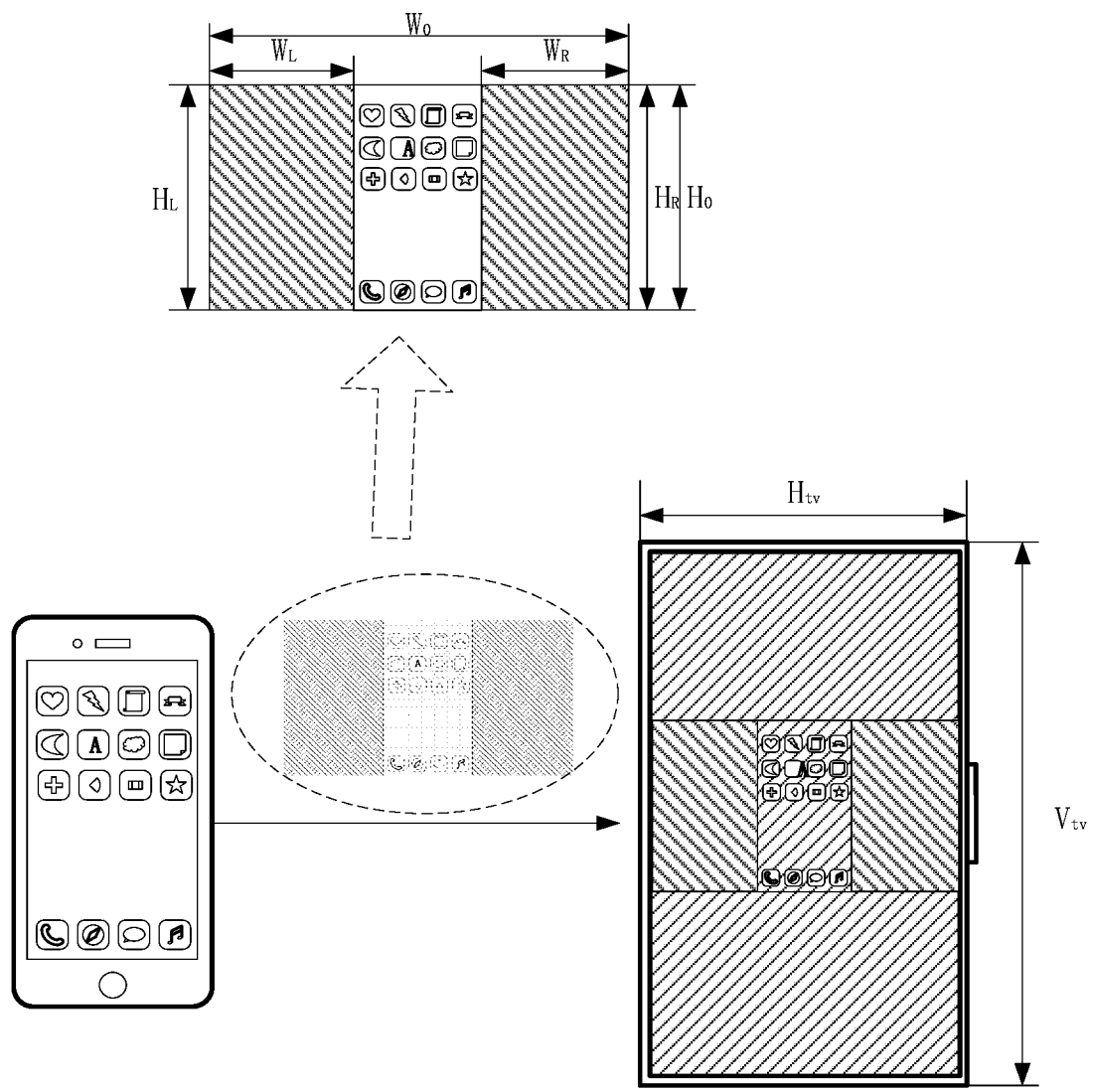
FIG. 9B illustrates a schematic diagram of black edge data and initial image data according to an embodiment of this disclosure.

In order to calculate the comparison value, the resolution of the effective image in the cast image needs to be determined, and thus, as shown in FIG. 9B, a range of a continuous black region may be detected from the left side of an image corresponding to the sampling image, and a range of a black edge region is obtained: a left black edge width $H_L$ and a left black edge height $V_L$. Then, a range of a continuous black region is detected from the right side of the image, and a range of a black edge region is obtained: a right black edge width $H_R$ and a right black edge height $V_R$, so that black edge data is formed. Meanwhile, the initial image data may be further extracted from the first frame of image. The initial image data includes an initial width $H_0$ and an initial height $V_0$ of the first frame of image, so as to calculate the reference value and the comparison value.

The reference value and the comparison value may be calculated according to the following formula: the reference value: $S_0=V_0=V_L=V_R$; and the comparison value: $S_X=H_0-(H_L+H_R)$.

Figure 10:
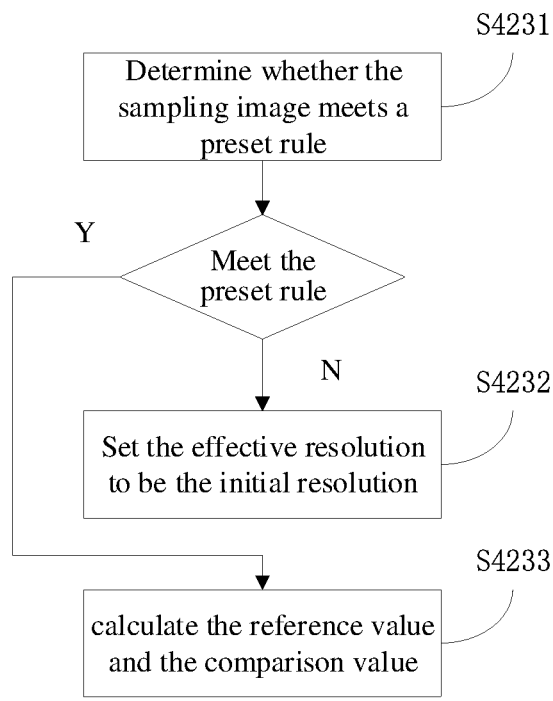
FIG. 10 illustrates a schematic flow diagram of determining a preset performing condition according to an embodiment of this disclosure.

As shown in FIG. 10, before calculating the reference value and the comparison value, the method further includes the following.

S4231: whether the sampling image meets a preset rule is determined.

S4232: if the sampling image does not meet the preset rule, the effective resolution is set to be the initial resolution.

S4233: if the sampling image meets the preset rule, the flow goes to: calculating the reference value and the comparison value.

In some embodiments, after the sampling image is obtained, an image displaying condition in the sampling image may be determined first to determine whether it meets the preset rule. The preset rule includes: the left black edge width $H_L$ is equal to the right black edge width $H_R$; and the left black edge height $V_L$, the right black edge height $V_R$ and an initial height $V_0$ are equal. That is, whether the sampling image meets "$H_L=H_R$ and $V_L=V_R=V_0$" is determined.

If the sampling image does not meet "$H_L=H_R$ and $V_L=V_R=V_0$", it is determined that the two sides of the sampling image are unequal in black edge width and height. This situation is usually because the content displayed on the mobile terminal 100B has an impact on the sampling result. Since it is difficult to determine the effective resolution in this situation, the cast image may be output by maintaining the original resolution, that is, the effective resolution is set to be the initial resolution, and the effective resolution corresponds to the image width $H_S=H_0$ and the image height $V_S=V_0$.

If the sampling image meets "$H_L=H_R$ and $V_L=V_R=V_0$", the effective resolution may be further determined, that is, the flow goes to: calculating the reference value and the comparison value, in order to compare the sampling resolution with the initial resolution.

For example, whether the sampling image meets "$H_0-(H_L+H_R)<V_0$" is determined, if "$H_0-(H_L+H_R)<V_0$" is not met, the original resolution is maintained for output, that is, the effective resolution is set to be the initial resolution, and the effective resolution corresponds to the image width $H_S=H_0$ and the image height $V_S=V_0$ If "$H_0-(H_L+H_R)<V_0$" is met, the effective resolution is set to be the sampling resolution, and the effective resolution corresponds to the output image width $H_S=H_0-(H_L+H_R)$ and the image height $V_S=V_0$.

During practical implementations, since the image content cast from the mobile terminal 100B is prone to affecting determination of the effective image region in the sampling image, for example, when the displayed image of the mobile terminal 100B corresponding to the sampling image happens to be black, if the range is still determined with continuous black pixels at the edges of the cast image, the black image will affect determination of the range of the black regions, thereby affecting a final sampling resolution extraction result. Therefore, in order to relieve the influence of the black image content on the sampling resolution, the step of extracting the sampling resolution from the cast video stream further includes the following.

S201: a plurality of frames of sampling images are obtained from the cast video stream according to a preset time interval.

S202: a sampling resolution of each frame of the sampling images is calculated.

By presetting the sampling time interval, sampling may be performed many times in the cast video stream, and the sampling resolution of the image in each time of sampling is extracted. For example, one frame of image is obtained every time interval T, and values of the sampling resolutions obtained through the above resolution algorithm are respectively: $S_{x0}, S_{x1}, \ldots, S_{xn}$.

Through performing sampling many times, the plurality of frames of sampling images may be collected with the change of the displayed image on the mobile terminal 100B. Typically, not all the plurality of frames of sampling images will be affected by the black image content, and thus collecting the plurality of frames of sampling images may lower the influence of the image content on determination of the range of the black edge regions, thereby improving the accuracy of determining the effective resolution.

Figure 11:
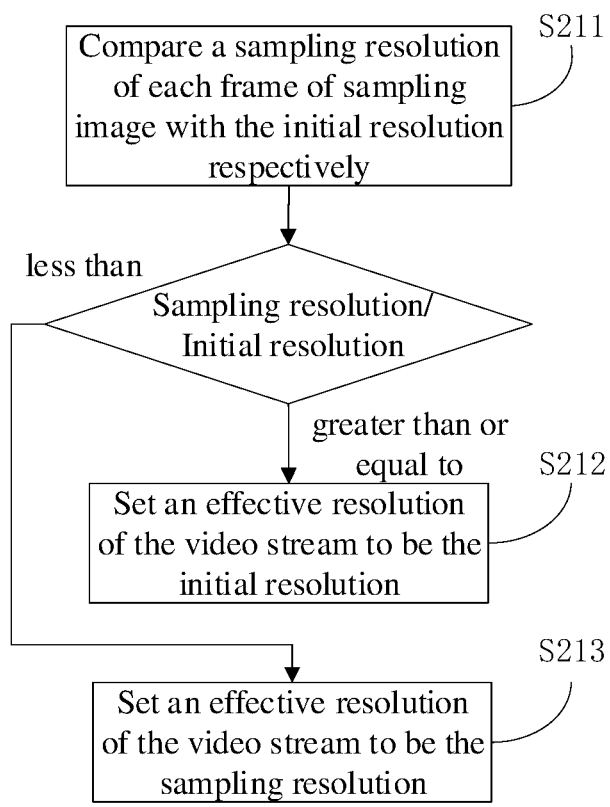
FIG. 11 illustrates a schematic flow diagram of comparing a plurality of sampling resolutions with an initial resolution according to an embodiment of this disclosure.

Further, as shown in FIG. 11, after the sampling resolutions corresponding to the plurality of frames of images are obtained, the sampling resolutions may be further determined respectively to obtain a comparison result of the sampling resolutions and the initial resolution, that is, the method further includes the following.

S211: the sampling resolution of each frame of sampling images and the initial resolution are compared respectively.

S212: if continuous sampling resolutions in a first sampling period are greater than or equal to the initial resolution, the effective resolution of the video stream is set to be the initial resolution.

S213: if continuous sampling resolutions in a second sampling period are less than the initial resolution, the effective resolution of the video stream is set to be the sampling resolution.

For example, $S_0$ is configured to have an initial value, and is updated by comparing with sampling resolutions in different sampling periods. In a sampling period, a plurality of frames are sampled. By comparing the sampling resolution of each frame of sampling images in a sampling period with the initial resolution respectively, if, in a first sampling period, continuously, $S_{10} \leq S_0, S_{11} \leq S_0, \ldots, S_{1n} \leq S_0$, the effective resolution is set to be $S_{1n}$, and the value $S_{xn}$ is assigned to $S_0$ from a previous sampling period, i.e., $S_0=S_{1n}$. That is, the previous $S_0$ is updated with sampling resolution Sin. If, in a second sampling period, continuously, $S_{20} \geq S_0$, $S_{21} \geq S_0, \ldots, S_{2n} \geq S_0$, where the $S_0$ is the initial resolution in the previous period, the effective resolution is set to be $S_0$. That is, the effective resolution is maintained and not updated with $S_{2n}$ in this sampling period.

In an implementation, the method further includes: if the effective resolution of the video stream is set to be the sampling resolution, the display 275 of the display apparatus 200 may be controlled to rotate to a portrait state. For example, the initial resolution is 1920×1080, and the sampling resolution is 960×1080. By calculating the reference value and the comparison value, it may be determined that the width of the effective image in the current sampling image is $S_X=H_0-(H_L+H_R)=960$, and the height of the first frame of image is 1080, so that it may be determined that the current effective resolution is the sampling resolution, i.e., the resolution of the effective image is 960×1080. Therefore, it may be determined that the corresponding displayed image on the mobile terminal 100B is a vertical image of 960×1080.

The vertical image is more suitable for being displayed in the portrait state, and thus after it is determined that the effective resolution is the sampling resolution, the controller 250 may send an instruction to the rotation assembly 276 to cause the rotation assembly 276 to drive the display 275 to rotate anticlockwise (or clockwise) to the portrait state.

After the display 275 is rotated to the portrait state, the cast image may be displayed according to the aspect ratio of 960:1080. However, since the display 275 has a large screen, its display resolution is usually 3840×2160 (in a landscape state, and 2160×3840 for the portrait state correspondingly). In order to display the cast image with the resolution of 960×1080, the cast image needs to be scaled to cause the display 275 to completely display the cast image.

In addition, purely adjusting the size of the cast image may cause the displayed cast image blur on the large screen, which significantly lowers user experience. Thus, while the cast image is scaled, image quality adjustment related to pixel interpolation may be further performed on the cast image to relieve the blurred image and improve the image display effect.

The method for detecting the effective resolution of the cast video stream can extract the initial resolution and the sampling resolution from the cast video stream after receiving the cast video stream, and then perform comparison to determine the effective resolution of the current video stream. If the sampling resolution is less than the initial resolution, the effective resolution of the video stream is set to be the sampling resolution. By setting the effective resolution of the video stream, the cast image may be displayed according to the effective resolution, so as to adapt to the display direction of the cast image and reduce influence of the black edges to achieve better user experience.

Figure 12:
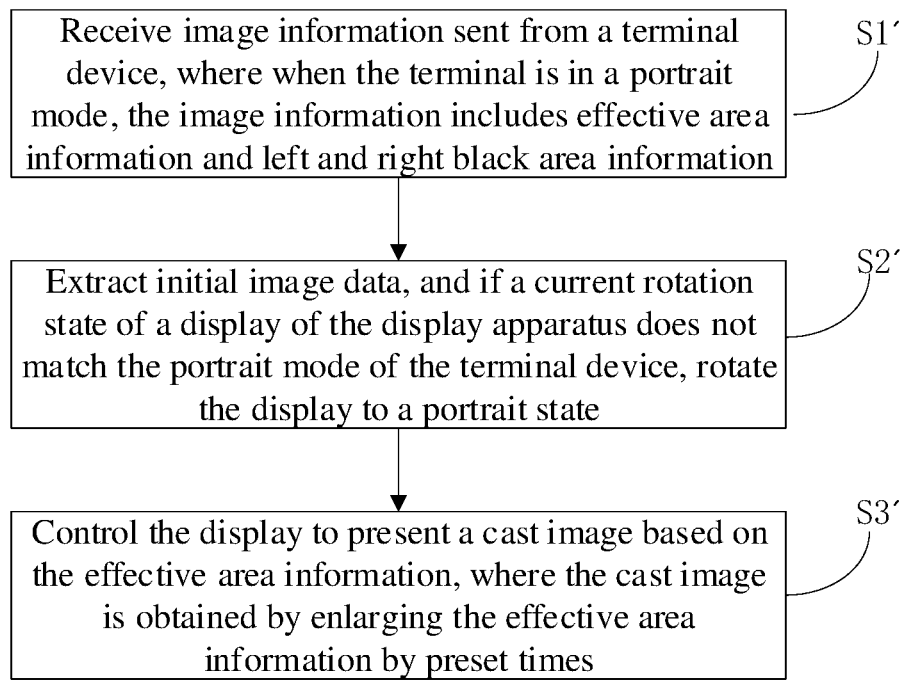
FIG. 12 illustrates a schematic diagram of a flow performed by a controller of a display apparatus according to an embodiment of this disclosure.

In other embodiments, another method for processing the cast image is provided, and correspondingly, a display apparatus is provided, including: a display; a rotation assembly, configured to drive the display to rotate; a user communication interface, configured to connect with a terminal; and a controller, referring to FIG. 12, configured to perform the following.

S1', image information sent from a terminal device is received, where when the terminal is in a portrait mode, the image information includes effective area information and left and right black area information.

In some embodiments, a cast and display operation may be performed on a mobile terminal 100B, and then the mobile terminal sends image information currently displayed on the mobile terminal to the display apparatus 200. For example, the cast operation may be triggered by selecting "setting-connection and share-cast" on a mobile phone and selecting one display apparatus in a current network from a device list for the cast operation as a cast object.

After the cast operation is performed, the mobile terminal 100B will send currently displayed image to the display apparatus 200 via a cast protocol, such as Miracast protocol or other cast protocols. With continuous generation of new interaction images in the cast process, the mobile terminal 100B will send the image to the display apparatus 200 frame by frame to form a cast video stream.

S2', if a current rotation state of a display of the display apparatus does not match the portrait mode of the terminal device, the display is rotated to the portrait state.

In some embodiments, whether the current rotation state of the display matches a display state of the terminal may be determined by analyzing whether the image information includes the left and right black area information respectively.

In some implementations, the controller obtains callback information about the rotation angle of the display, and determines a target rotation state of the display according to whether the image information obtained from the mobile terminal includes left and right black edges.

When the image information does not include the left and right black area information, it indicates that the mobile terminal is currently in a landscape mode, and when the current rotation state of the display is detected to be the landscape state, the mobile terminal and the display match. In this case, the display does not need to be rotated. When the current rotation state of the display is detected to be the portrait state, the mobile terminal and the display do not match, and the display needs to be rotated to a target state which matches the state of the mobile terminal, i.e., the landscape state.

When the image information includes left and right black areas, it indicates that the mobile terminal is currently in a portrait mode, and when the current rotation state of the display is detected to be the landscape state, the mobile terminal and the display do not match, and the display needs to be rotated to the portrait state. When the current rotation state of the display is detected to be the portrait state, the mobile terminal and the display match, and the display does not need to be rotated.

After the cast operation is triggered on the mobile terminal 100B, the mobile terminal 100B will send the cast images to the display apparatus 200 via a mirror cast protocol or other cast protocols. The controller 250 may receive the image information sent from the terminal and detect a current rotation state of the display 275. The detection of the rotation state of the display 275 may be completed through sensors disposed in the display apparatus 200.

For example, sensor devices such as a gyroscope and a gravitational acceleration sensor may be disposed on the display 275 of the display apparatus 200, and attitude data of the display 275 relative to a gravity direction is determined by measuring angular acceleration or the gravity direction. Then, the detected attitude data is compared with attitude data in the landscape state and the portrait state respectively to determine the current rotation state of the display 275. For another example, a grating angle sensor, a magnetic field angle sensor or a sliding resistor angle sensor may be disposed on the rotation assembly 276, and a rotation angle of the rotation assembly 276 is measured and compared with angles in the landscape state and the portrait state respectively to determine the current rotation state of the display 275.

In some embodiments, the controller is further configured to: calculate a rotation direction and a rotation angle of the cast image; where the rotation direction of the cast image is opposite to a rotation direction of the display; and the rotation angle of the cast image is equal to a rotation angle of the display; and rotate the cast image according to the rotation direction and the rotation angle.

S3', the display is controlled to present a cast image based on the effective area information, where the cast image is obtained by enlarging the effective area information by preset times.

After the display apparatus 200 receives the cast video stream, the controller 250 of the display apparatus may analyze the received cast video stream frame by frame. For example, an image aspect ratio of the cast video stream sent from the mobile terminal 100B is 1920:1080, and after receiving the cast video stream, the controller 250 may parse the cast video stream to obtain a frame image. A resolution of the frame image is extracted as 1920×1080, which is an initial resolution.

After the resolution is extracted, the frame images in the cast video stream may be further sampled to extract an effective resolution. The frame of image used for sampling is called a sampling image. The effective resolution is a resolution, extracted from the cast video stream, of an effective image on frame data. Specifically, the effective resolution may be obtained from the cast video stream according to a preset time interval.

In the sampling process, in order to determine an effective image from the sampling image, color values of pixels in the sampling image may be traversed. Apparently, a color value of a pixel in a black region is black, a color value of a pixel in an effective region is usually not completely black, and thus, by traversing each pixel of the sampling image, a black and rectangular region may be determined as a black edge, while other regions may be the effective image.

It should be noted that according to the adaptive display method of the display apparatus 200, a color filling region is not only limited to black. For example, in order to adapt to an overall user interface (UI) design style of an operating system, the black region may be gray, blue or other colors, and may also be a gradient ramp, a specific pattern, etc. For these situations, for the ease of subsequent descriptions, it is still called the black region or black edge in the application.

After the frame image resolution and the effective resolution are obtained for the cast video stream, the effective resolution and the frame image resolution may be compared to determine the information (e.g., a ratio, a direction, etc.) of the effective image in the current cast video stream according to a difference between the effective resolution and the frame image resolution, so as to select displaying parameters according to the effective image.

For example, if the effective resolution is equal to the frame image resolution, that is, the resolution of the first frame of image is 1920×1080, and the resolution of the effective region determined in the sampling image is also 1920×1080, it indicates that there is no black edge in the current cast image, and the cast image can fill a display region full. That is, the display requirement of the cast image can be met by displaying directly in the landscape state of the display 275.

It should be noted that the resolution of the displayed image is usually represented by the number of pixels occupied in a width direction and a height direction of the image, such as 1920×1080. Direct comparison is usually difficult purely through the values of the resolution. For example, by comparing the values, the resolution 1920×1080 is equal to 1080×1920. Thus, in the actual comparison process, some values in the resolution may be extracted or the resolution is converted to other comparable values, and then comparison is performed to obtain a comparison result of the effective resolution and the frame image resolution. For example, the width or height of the overall image may be extracted from the frame image resolution and compared with the height or width of the effective image, so as to determine its effective resolution.

A method for detecting an effective resolution of a cast video stream provided by the disclosure can extract the frame image resolution and the effective resolution from the cast video stream after receiving the cast video stream, and then perform comparison to determine the effective resolution of the current video stream. By setting the effective resolution of the video stream, the cast image may be displayed according to the effective resolution so as to adapt to the display direction of the cast image and reduce the influence of the black edges to achieve better user experience.

Figure 13:
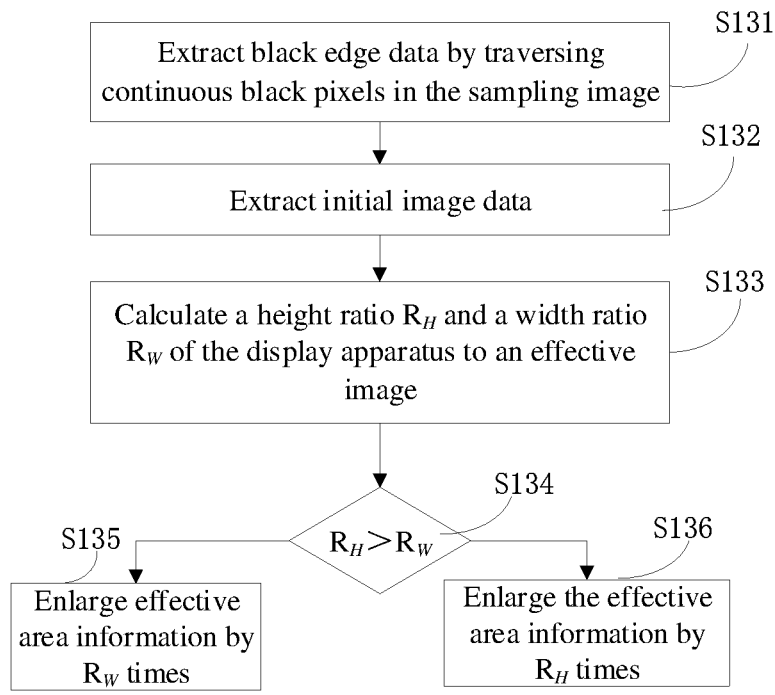
FIG. 13 illustrates a schematic flow diagram of determining enlarging information according to height and width ratios of a display apparatus to an effective image according to an embodiment of this disclosure.

In order to calculate how many times to enlarge the effective image, in some embodiments, as shown in FIG. 13, the method further includes the following.

S131: black edge data is extracted by traversing continuous black pixels in the sampling image.

S132: initial image data is extracted.

S133: a height ratio $R_H$ and a width ratio $R_W$ of the display apparatus to the effective image are calculated.

S134: the magnitude of $R_H > R_W$ is determined.

As shown in FIG. 9B, a width of an image frame output from the mobile terminal is a or denoted as $H_0$, and a height thereof is $H_{ph}$ or denoted as $V_L$; and in the portrait state, a width of the display apparatus is $W_{tv}$, and a height thereof is $H_{tv}$. A range of a continuous black region may be detected from the left side of a picture corresponding to the effective image, and a range of the black region is obtained: a left black edge width a and a left black edge height $H_{ph}$. Then, a range of a continuous black region is detected from the right side of the image, and a range of the black region is obtained: a right black edge width a and a right black edge height $H_{ph}$, so that black edge data is formed. In this case, in the obtained image information sent from the mobile terminal, the resolution of the effective image is $(H_0-2a) *V_{Lh}$. The resolution of the display apparatus is $W_{tv}*H_{tv}$.

A height ratio of the display apparatus to the effective area information is $R_H=H_{tv}/H_{ph}$, a width ratio of the display apparatus to the effective area information is $R_W=W_0/(W_0-2a)$, and if $R_H>R_W$, S135 is performed to enlarge the effective area information by $R_W$ times to obtain the cast image; and if $R_H<R_W$, S136B is performed to enlarge the effective area information by $R_H$ times to obtain the cast image.

Figure 14:
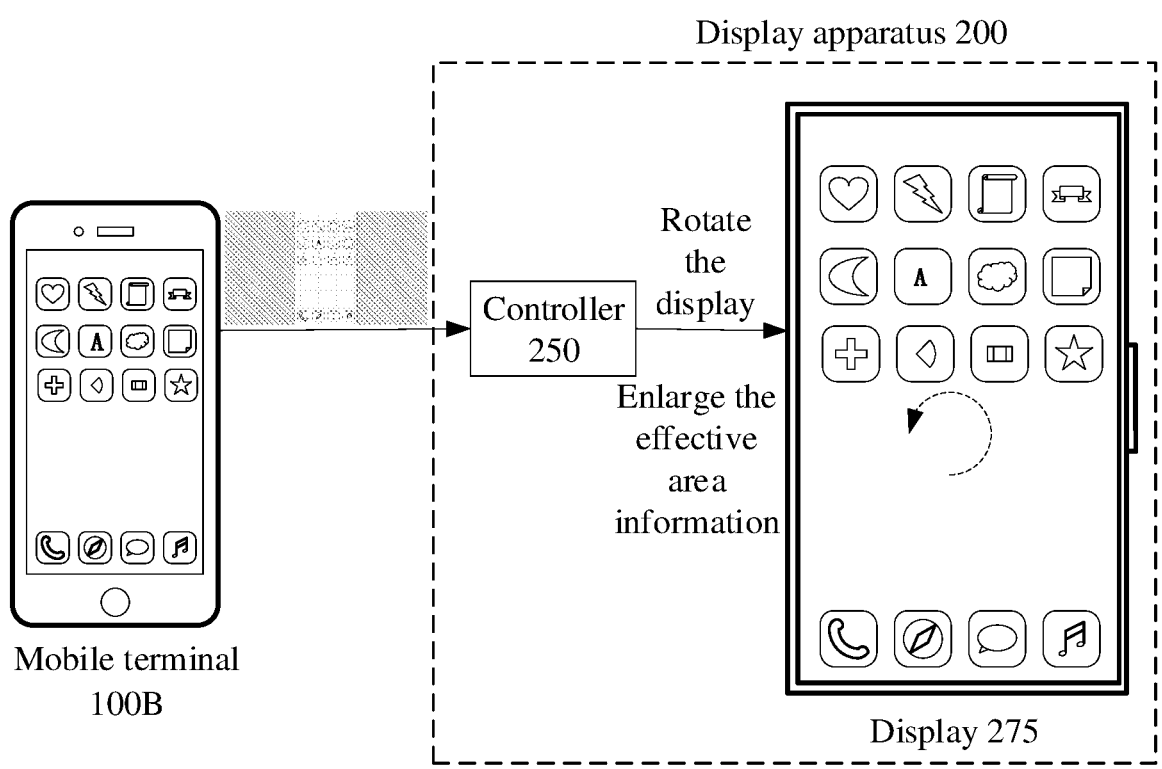
FIG. 14 illustrates a schematic structural diagram of a display apparatus according to an embodiment of this disclosure.

As shown in FIG. 14, the display apparatus can determine whether the mobile terminal is in the portrait mode according to the image information and automatically adjust the rotation state of the display, so that the cast image is displayed by using a larger display space, avoiding a situation where a traditional smart television cannot display the cast image from a mobile terminal properly.

Now there are many cast protocols and mirroring protocols, such as a cast protocol based on the Miracast standard, a cast protocol based on the DLNA standard, a cast protocol based on the Airplay standard or a customized cast manner.

In some cast protocols, the display apparatus may obtain a video stream from the mobile terminal, for example, in Airplay protocol, image data of a screen on the mobile terminal may be sent to the display apparatus. In this way, the display apparatus may directly determine whether the image is horizontal or vertical according to an aspect ratio of the image.

In some other cast protocols, the display apparatus cannot obtain the real screen video stream of the mobile terminal, that is, before sending cast data from the mobile device to the display apparatus, screen data information is processed first, for example, in the cast protocol based on the Miracast standard, a smart device always sends a horizontal media resource to the display apparatus, and no matter whether the screen is in horizontal or vertical arrangement, the display apparatus always obtains horizontal video data.

For example, when the mobile terminal is placed vertically for mirror cast, before sending the screen data to the display apparatus, black edges are first added to two sides of the screen data. It is intended to adapt to supposedly horizontally placed display apparatus.

However, since the display apparatus can be rotated horizontally or vertically, current cast protocol based on the Miracast standard has not yet had adapting processing for the portrait state of the display apparatus, and the image data received at the display apparatus is still a landscape resource with the black edges.

In the embodiments below, when the display apparatus receives a cast resource, whether an image in the cast resource has black edges is always determined, and since the display apparatus cannot obtain vertical or horizontal placements of the mobile terminal, the display apparatus cannot perform rotation according to an effective image in the image. No matter whether a mobile phone is in a landscape state or a portrait state, after the horizontal cast data is received, the cast data is directly presented.

Of course, the display apparatus is only not rotated according to the cast data, no matter whether the display apparatus is in the landscape state or the portrait state, a user can still issue a command to rotate, so that the display apparatus, such as a rotatable television, is rotated to a state different from a previous state. Viewing from a front face of the display apparatus, the rotation assembly 276 may rotate a display screen to the portrait state, i.e., a state that the length of the screen at the vertical side is greater than the length of the screen at the horizontal side, and may also rotate the screen to the landscape state, i.e., a state that the length of the screen at the horizontal side is greater than the length of the screen at the vertical side.

For example, if the display apparatus is at a horizontal state, an image as shown in FIG. 5A or FIG. 6A is displayed. For FIG. 5A, the mobile terminal is horizontally placed, a cast data stream is a full-screen horizontal resource without the black edges on two sides. For FIG. 6A, the mobile terminal is vertically placed, a cast data stream is a horizontal resource which has the black edges on two sides and an effective image only in the middle of the data stream. In the two display placements of the mobile terminal, the display apparatus always receives a horizontal resource.

Figure 15A:
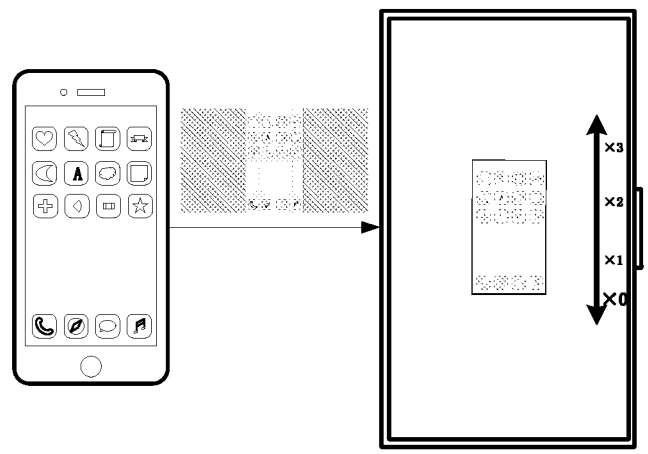
FIGS. 15A-15C illustrate schematic diagrams of a user interface of a cast image received by a display apparatus under a portrait state according to an embodiment of this disclosure.
Figure 15B:
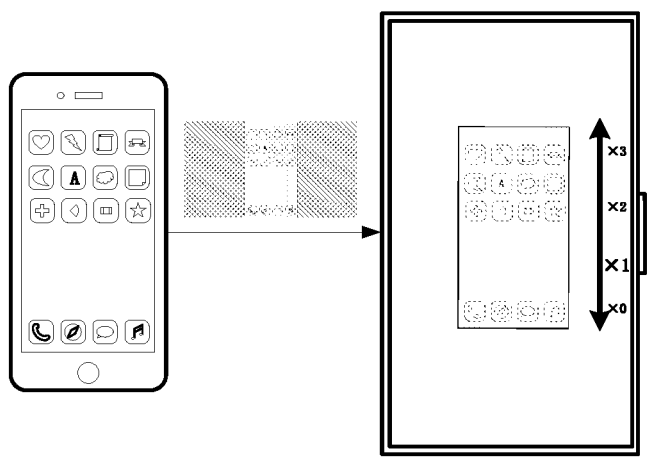
Figure 15C:
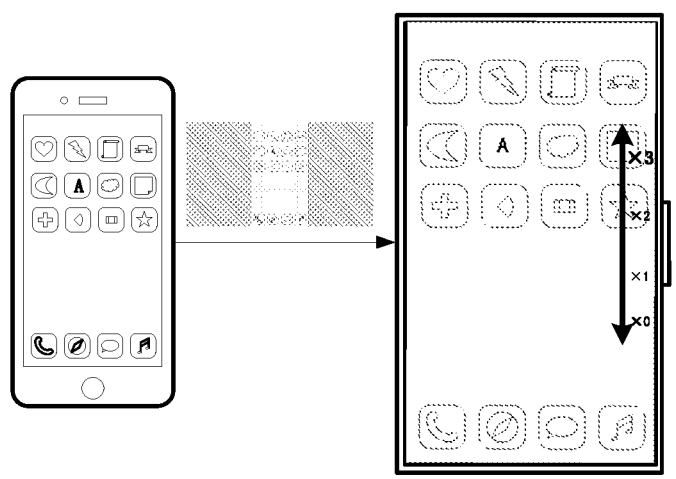

If the display apparatus is in a vertical state, an image as shown in FIG. 5B or FIG. 6B is displayed. In the case of FIG. 6B, since the effective image occupies not much space in the screen, in order to improve user experience, in some embodiments, a command may be sent via a remote control or voice, gestures and other ways to enlarge a current mirror interface. Accordingly, a scaling control or menu is shown on a user interface of the display apparatus, as shown in FIG. 15A. After the enlarging operation is received, optionally, an operation bar will disappear automatically within preset time. For example, it may be called through keys "up, down, left, right and OK" on the remote control, and it may be manually enlarged to certain times through the remote control, as shown in FIGS. 15B and 15C.

In some embodiments, the display apparatus only presents the scaling control or menu in the portrait state, while in the landscape state, the scaling control or menu is not displayed.

In some other implementations, in the cast process, when a rotation instruction for rotating from the portrait state to the landscape state is received, the display is rotated from the portrait state to the landscape state, a mirrored displayed image will be configured via ConfigurationChange, and a new display effect is presented after rotation is completed.

Those skilled in the art may make various modifications and variations to the present application without departing from the spirit and scope of the present application. Those modifications shall fall within the protection scope of the disclosure.

What is claimed is:

1. A display apparatus, comprising:
   a display;
   a rotation assembly, configured to drive the display to rotate to a rotation state, wherein the rotation state comprises: a landscape state or a portrait state;
   a communication interface, configured to connect with a terminal device; and
   a controller, in connection with the display, the rotation assembly and the communication interface and configured to:
      receive image information sent from the terminal device; wherein the image information comprises effective area information and left and right black area information while the terminal device is in a portrait mode during transmission of the image information, and the effective area information corresponds to a content displayed on a current screen of the terminal device and is a rectangle with a width and a length;
      in response to a current rotation state of the display and the portrait mode of the terminal device being not matched, cause the rotation assembly to rotate the display to the portrait state to match the portrait mode of the terminal device;
      in response to a current rotation state of the display and the portrait mode of the terminal device being matched, not cause the rotation assembly to rotate the display and maintain the current rotation state of the display; and
      control the display to present a cast image based on the effective area information, wherein the cast image is obtained by enlarging the effective area information by preset times.

2. The display apparatus according to claim 1, wherein the controller is further configured to:
   obtain callback information about a rotation angle of the display; and
   determine a target rotation state of the display according to the image information from the terminal device, so as to determine whether the current rotation state of the display matches the portrait mode of the terminal device by determining whether the current rotation state is the target rotation state.

3. The display apparatus according to claim 2, wherein the controller is further configured to:
   in response to the image information received from the terminal device comprising the left and right black area information, determine that the target rotation state of the display is the portrait state; and
   in response to the image information received from the terminal device not comprising the left and right black area information, determine that the target rotation state of the display is the landscape state.

4. The display apparatus according to claim 1, wherein the controller is further configured to:
   calculate a height ratio $R_H$ and a width ratio $R_W$ of the display to the effective area information,
   in response to $R_H > R_W$, enlarge the effective area information by $R_W$ times to obtain the cast image; and
   in response to $R_H < R_W$, enlarge the effective area information by $R_H$ times to obtain the cast image.

5. The display apparatus according to claim 2, wherein the controller is further configured to:
   calculate a rotation direction and the rotation angle of the cast image; wherein the rotation direction of the cast image is opposite to a rotation direction of the display; and the rotation angle of the cast image is equal to a rotation angle of the display; and
   rotate the cast image according to the rotation direction and the rotation angle of the cast image.

6. The display apparatus according to claim 1, wherein the controller is further configured to:
   extract an initial resolution from the image information; wherein the initial resolution is a resolution of a first frame of multiple frame images in the image information;
   determine sampling resolutions from the image information; wherein the sampling resolutions are resolutions, extracted from multiple frames of sampling images in the image information according to a preset time interval, of effective regions on the multiple frames of sampling images;
compare the sampling resolutions and the initial resolution;
in response to the sampling resolutions being greater than or equal to the initial resolution, determine an effective resolution of the image information to be the initial resolution; and
in response to the sampling resolutions being less than the initial resolution, determine the effective resolution of the image information to be one of the sampling resolutions.

7. The display apparatus according to claim 6, wherein the controller is further configured to:
extract a reference value according to the initial resolution; wherein the reference value is an image height of the first frame;
generate a comparison value by traversing an effective area in each of the sampling images; wherein the comparison value is the width of the effective area in each sampling image;
in response to the comparison value being greater than or equal to the reference value, determine that the sampling resolution is greater than or equal to the initial resolution; and
in response to the comparison value being less than the reference value, determine that the sampling resolution is less than the initial resolution.

8. The display apparatus according to claim 6, wherein the controller is further configured to:
calculate a sampling resolution in each frame of the sampling images;
compare the sampling resolution in each frame of the sampling images and the initial resolution respectively;
in response to continuous sampling resolutions in a first sampling period being greater than or equal to the initial resolution, determine the effective resolution of the image information to be the initial resolution; and
in response to continuous sampling resolutions in a second sampling period being less than the initial resolution, determine the effective resolution of the image information to be the one of the sampling resolutions.

9. The display apparatus according to claim 6, wherein the controller is further configured to:
scaling the cast image corresponding to the image information according to the effective resolution to be displayed.

10. The display apparatus according to claim 6, wherein the controller is further configured to:
in response to the effective resolution of the image information being the one of the sampling resolutions, cause the rotation assembly to rotate the display to the portrait state.

11. A cast method for a display apparatus, comprising:
receiving, by the display apparatus, image information sent from a terminal device, wherein the image information comprises effective area information and left and right black area information while the terminal device is in a portrait mode during transmission of the image information, and the effective area information corresponds to a content displayed on a current screen of the terminal device and is a rectangle with a width and a length, wherein the display apparatus comprises a display and a rotation assembly configured to drive the display to rotate to a rotation state, wherein the rotation state comprises: a landscape state or a portrait state;
in response to a current rotation state of the display and the portrait mode of the terminal device being not matched, causing the rotation assembly to rotate the display to the portrait state to match the portrait mode of the terminal device;
in response to a current rotation state of the display and the portrait mode of the terminal device being matched, not causing the rotation assembly to rotate the display and maintaining the current rotation state of the display; and
controlling the display to present a cast image based on the effective area information, wherein the cast image is obtained by enlarging the effective area information by preset times.

12. The cast method according to claim 11, wherein the method further comprises:
obtaining callback information about a rotation angle of the display; and
determining a target rotation state of the display according to the image information from the terminal device, so as to determine whether the current rotation state of the display matches the portrait mode of the terminal device by determining whether the current rotation state is the target rotation state.

13. The cast method according to claim 12, wherein the determining the target rotation state of the display according to the image information comprises:
in response to the image information received from the terminal device comprising the left and right black area information, determining that the target rotation state of the display is the portrait state; and
in response to the image information received from the terminal device not comprising the left and right black area information, determining that the target rotation state of the display is the landscape state.

14. The cast method according to claim 11, wherein the method further comprises:
calculating a height ratio $R_H$ and a width ratio $R_W$ of the display to the effective area information,
in response to $R_H > R_W$, enlarging the effective area information by $R_W$ times to obtain the cast image; and
in response to $R_H < R_W$, enlarging the effective area information by $R_H$ times to obtain the cast image.

15. The cast method according to claim 12, wherein the method further comprises:
calculating a rotation direction and the rotation angle of the cast image; wherein the rotation direction of the cast image is opposite to a rotation direction of the display; and the rotation angle of the cast image is equal to a rotation angle of the display; and
rotating the cast image according to the rotation direction and the rotation angle of the cast image.

16. The cast method according to claim 11, wherein the method further comprises:
extracting an initial resolution from the image information; wherein the initial resolution is a resolution of a first frame of multiple frame images in the image information;
determining sampling resolutions from the image information; wherein the sampling resolutions are resolutions, extracted from multiple frames of sampling images in the image information according to a preset time interval, of effective regions on the multiple frames of sampling images;

comparing the sampling resolutions and the initial resolution;

in response to the sampling resolutions being greater than or equal to the initial resolution, determining an effective resolution of the image information to be the initial resolution; and in response to the sampling resolutions being less than the initial resolution, determining the effective resolution of the image information to be one of the sampling resolutions.

17. The cast method according to claim 16, wherein the comparing the sampling resolutions and the initial resolution comprises:

extracting a reference value according to the initial resolution; wherein the reference value is an image height of the first frame;

generating a comparison value by traversing an effective area in each of the sampling images; wherein the comparison value is the width of the effective area in each sampling image;

in response to the comparison value being greater than or equal to the reference value, determining that the sampling resolution is greater than or equal to the initial resolution; and in response to the comparison value being less than the reference value, determining that the sampling resolution is less than the initial resolution.

18. The cast method according to claim 16, wherein the method further comprises:

calculating a sampling resolution in each frame of the sampling images;

comparing the sampling resolution in each frame of the sampling images and the initial resolution respectively;

in response to continuous sampling resolutions in a first sampling period being greater than or equal to the initial resolution, determining the effective resolution of the image information to be the initial resolution; and in response to continuous sampling resolutions in a second sampling period being less than the initial resolution, determining the effective resolution of the image information to be the one of the sampling resolutions.

19. The cast method according to claim 16, wherein the method further comprises:

scaling the cast image corresponding to the image information according to the effective resolution to be displayed.

20. The cast method according to claim 16, wherein the method further comprises:

in response to the effective resolution of the image information being the one of the sampling resolutions, causing the rotation assembly to rotate the display to the portrait state.

* * * * *